United States Patent
Mikami

(10) Patent No.: US 7,348,192 B2
(45) Date of Patent: Mar. 25, 2008

(54) METHOD FOR MONITORING FILM THICKNESS, A SYSTEM FOR MONITORING FILM THICKNESS, A METHOD FOR MANUFACTURING A SEMICONDUCTOR DEVICE, AND A PROGRAM PRODUCT FOR CONTROLLING FILM THICKNESS MONITORING SYSTEM

(75) Inventor: Toru Mikami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 454 days.

(21) Appl. No.: 10/933,441

(22) Filed: Sep. 3, 2004

(65) Prior Publication Data

US 2005/0095730 A1   May 5, 2005

(30) Foreign Application Priority Data

Sep. 5, 2003   (JP) .......................... P2003-314626

(51) Int. Cl.
*H01L 21/66* (2006.01)
(52) U.S. Cl. ...................................................... 438/16
(58) Field of Classification Search ................ 438/6, 438/10, 104, 107–114, 118, 121–123, 128–129, 438/135, 142, 145, 149, 151, 157, 176, 478, 438/184, 193, 195–198, 200–203, 206–207, 438/209–211, 218, 237, 165, 294, 308, 337, 438/353

See application file for complete search history.

(56) References Cited

U.S. PATENT DOCUMENTS

| | | | | |
|---|---|---|---|---|
| 3,474,457 A | * | 10/1969 | Becker | 347/249 |
| 4,554,727 A | * | 11/1985 | Deckman et al. | 438/71 |
| 5,674,652 A | * | 10/1997 | Bishop et al. | 430/30 |
| 6,392,756 B1 | * | 5/2002 | Li et al. | 356/632 |
| 2002/0045282 A1 | * | 4/2002 | Opsal et al. | 438/16 |
| 2002/0163652 A1 | | 11/2002 | Mikami et al. | |
| 2006/0082786 A1 | * | 4/2006 | Kim et al. | 356/504 |

FOREIGN PATENT DOCUMENTS

JP   2001-317931   11/2001

\* cited by examiner

*Primary Examiner*—Michael Lebentritt
*Assistant Examiner*—Andre' Stevenson
(74) *Attorney, Agent, or Firm*—Finngean, Henderson, Farabow, Garett & Dunner, L.L.P.

(57) ABSTRACT

A method monitors a thickness of a subject film deposited on an underlying structure, the underlying structure contains at least one thin film formed on a substrate. The method includes determining thickness data of the underlying structure and storing the thickness data of the underlying structure in a thickness memory; measuring profile of optical spectrum of the subject film on the underlying structure; reading the thickness data of the underlying from the thickness memory; calculating theoretical profiles of the optimal spectrum of the subject film based upon corresponding candidate film thicknesses of the subject film and the thickness data of the underlying structure; and searching a theoretical profile of the subject film, which is closest to the measured profile of optical spectrum of the subject film so as to determine a thickness of the subject film.

6 Claims, 23 Drawing Sheets

FIG. 7A

| | LOT 1 | | | | LOT 2 | | | | ... |
|---|---|---|---|---|---|---|---|---|---|
| | WAFER 1 | WAFER 2 | WAFER 3 | ... WAFER n | WAFER 1 | WAFER 2 | WAFER 3 | ... WAFER n | ... |
| 1ST FILM | $T_A, L_1, W_1$ | $T_A, L_1, W_2$ | $T_A, L_1, W_3$ | ... $T_A, L_1, W_n$ | $T_A, L_2, W_1$ | $T_A, L_2, W_2$ | $T_A, L_2, W_3$ | ... $T_A, L_2, W_n$ | ... |

| | LOT m | | | |
|---|---|---|---|---|
| | WAFER 1 | WAFER 2 | WAFER 3 | ... WAFER n |
| ... | $T_A, L_m, W_1$ | $T_A, L_m, W_2$ | $T_A, L_m, W_3$ | ... $T_A, L_m, W_n$ |

FIG. 7B

| | LOT 1 | | | | LOT 2 | | | | ... |
|---|---|---|---|---|---|---|---|---|---|
| | WAFER 1 | WAFER 2 | WAFER 3 | ... WAFER n | WAFER 1 | WAFER 2 | WAFER 3 | ... WAFER n | ... |
| 1ST FILM | $T_A, L_1, W_1$ | $T_A, L_1, W_2$ | $T_A, L_1, W_3$ | ... $T_A, L_1, W_n$ | $T_A, L_2, W_1$ | $T_A, L_2, W_2$ | $T_A, L_2, W_3$ | ... $T_A, L_2, W_n$ | ... |
| 2ND FILM | $T_B, L_1, W_1$ | $T_B, L_1, W_2$ | $T_B, L_1, W_3$ | ... $T_B, L_1, W_n$ | $T_B, L_2, W_1$ | $T_B, L_2, W_2$ | $T_B, L_2, W_3$ | ... $T_B, L_2, W_n$ | ... |

| | LOT m | | | |
|---|---|---|---|---|
| | WAFER 1 | WAFER 2 | WAFER 3 | ... WAFER n |
| ... | $T_A, L_m, W_1$ | $T_A, L_m, W_2$ | $T_A, L_m, W_3$ | ... $T_A, L_m, W_n$ |
| ... | $T_B, L_m, W_1$ | $T_B, L_m, W_2$ | $T_B, L_m, W_3$ | $T_B, L_m, W_n$ |

FIG. 7C

| | LOT 1 | | | | LOT 2 | | | | ... |
|---|---|---|---|---|---|---|---|---|---|
| | WAFER 1 | WAFER 2 | WAFER 3 | ... WAFER n | WAFER 1 | WAFER 2 | WAFER 3 | ... WAFER n | ... |
| 1ST FILM | $T_A, L_1, W_1$ | $T_A, L_1, W_2$ | $T_A, L_1, W_3$ | ... $T_A, L_1, W_n$ | $T_A, L_2, W_1$ | $T_A, L_2, W_2$ | $T_A, L_2, W_3$ | ... $T_A, L_2, W_n$ | ... |
| 2ND FILM | $T_B, L_1, W_1$ | $T_B, L_1, W_2$ | $T_B, L_1, W_3$ | ... $T_B, L_1, W_n$ | $T_B, L_2, W_1$ | $T_B, L_2, W_2$ | $T_B, L_2, W_3$ | ... $T_B, L_2, W_n$ | ... |
| 3RD FILM | $T_C, L_1, W_1$ | $T_C, L_1, W_2$ | $T_C, L_1, W_3$ | ... $T_C, L_1, W_n$ | $T_C, L_2, W_1$ | $T_C, L_2, W_2$ | $T_C, L_2, W_3$ | ... $T_C, L_2, W_n$ | ... |

| | LOT m | | | |
|---|---|---|---|---|
| | WAFER 1 | WAFER 2 | WAFER 3 | ... WAFER n |
| ... | $T_A, L_m, W_1$ | $T_A, L_m, W_2$ | $T_A, L_m, W_3$ | ... $T_A, L_m, W_n$ |
| ... | $T_B, L_m, W_1$ | $T_B, L_m, W_2$ | $T_B, L_m, W_3$ | $T_B, L_m, W_n$ |
| ... | $T_C, L_m, W_1$ | $T_C, L_m, W_2$ | $T_C, L_m, W_3$ | $T_C, L_m, W_n$ |

FIG. 8

| | WAFER 1 | | | | | WAFER 2 | | | | ... |
|---|---|---|---|---|---|---|---|---|---|---|
| | SITE 1 | SITE 2 | SITE 3 | --- | SITE k | SITE 1 | SITE 2 | SITE 3 | --- SITE k | ... |
| 1ST FILM | $T_{A,L1,W1,S1}$ | $T_{A,L1,W1,S2}$ | $T_{A,L1,W1,S3}$ | --- | $T_{A,L1,W1,Sk}$ | $T_{A,L1,W2,S1}$ | $T_{A,L1,W2,S2}$ | $T_{A,L1,W2,S3}$ | --- $T_{A,L1,W2,Sk}$ | ... |
| 2ND FILM | $T_{B,L1,W1,S1}$ | $T_{B,L1,W1,S2}$ | $T_{B,L1,W1,S3}$ | --- | $T_{B,L1,W1,Sk}$ | $T_{B,L1,W2,S1}$ | $T_{B,L1,W2,S2}$ | $T_{B,L1,W2,S3}$ | --- $T_{B,L1,W2,Sk}$ | ... |
| 3RD FILM | $T_{C,L1,W1,S1}$ | $T_{C,L1,W1,S2}$ | $T_{C,L1,W1,S3}$ | --- | $T_{C,L1,W1,Sk}$ | $T_{C,L1,W2,S1}$ | $T_{C,L1,W2,S2}$ | $T_{C,L1,W2,S3}$ | --- $T_{C,L1,W2,Sk}$ | ... |

| ... | WAFER n | | | | |
|---|---|---|---|---|---|
| ... | SITE 1 | SITE 2 | SITE 3 | --- | SITE k |
| ... | $T_{A,L1,Wn,S1}$ | $T_{A,L1,Wn,S2}$ | $T_{A,L1,Wn,S3}$ | --- | $T_{A,L1,Wn,Sk}$ |
| ... | $T_{B,L1,Wn,S1}$ | $T_{B,L1,Wn,S2}$ | $T_{B,L1,Wn,S3}$ | | $T_{B,L1,Wn,Sk}$ |
| ... | $T_{C,L1,Wn,S1}$ | $T_{C,L1,Wn,S2}$ | $T_{C,L1,Wn,S3}$ | | $T_{C,L1,Wn,Sk}$ |

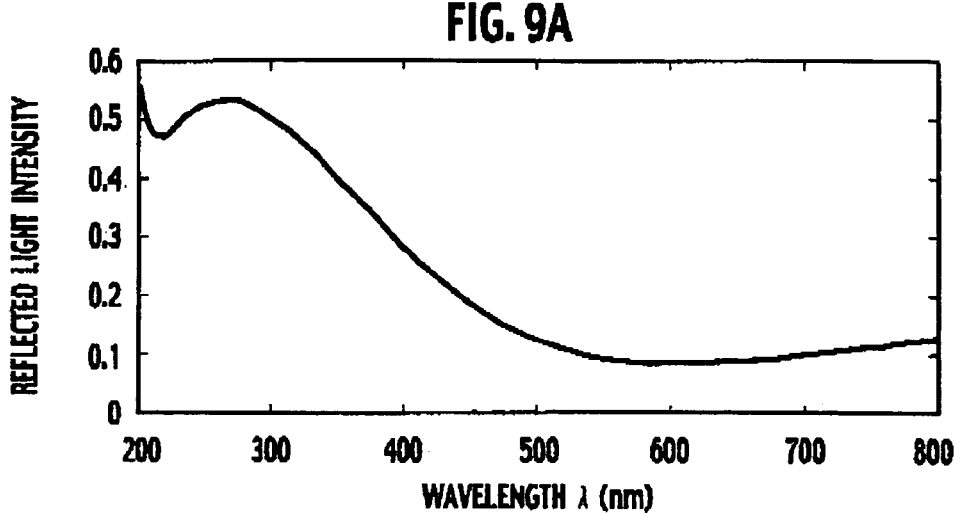
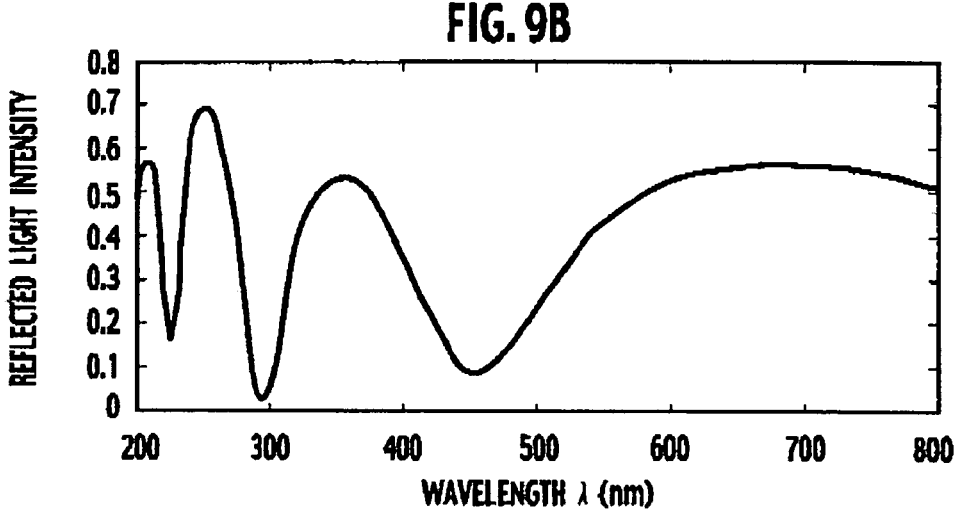
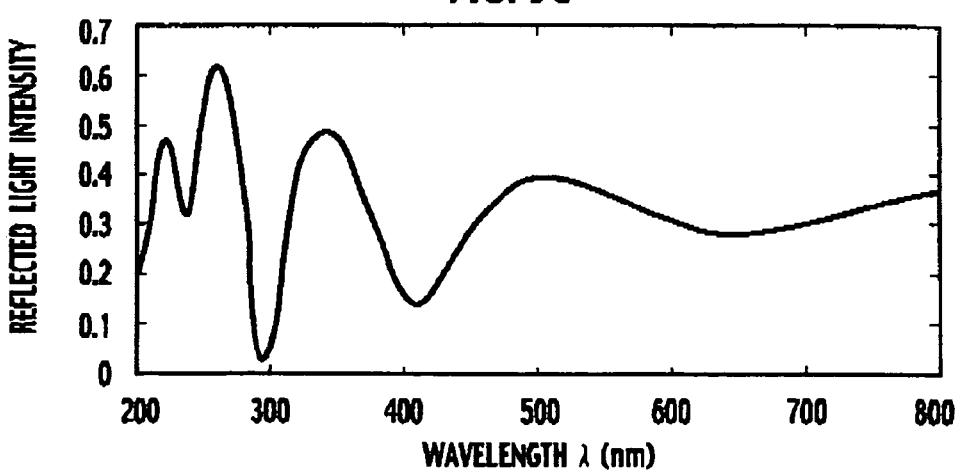

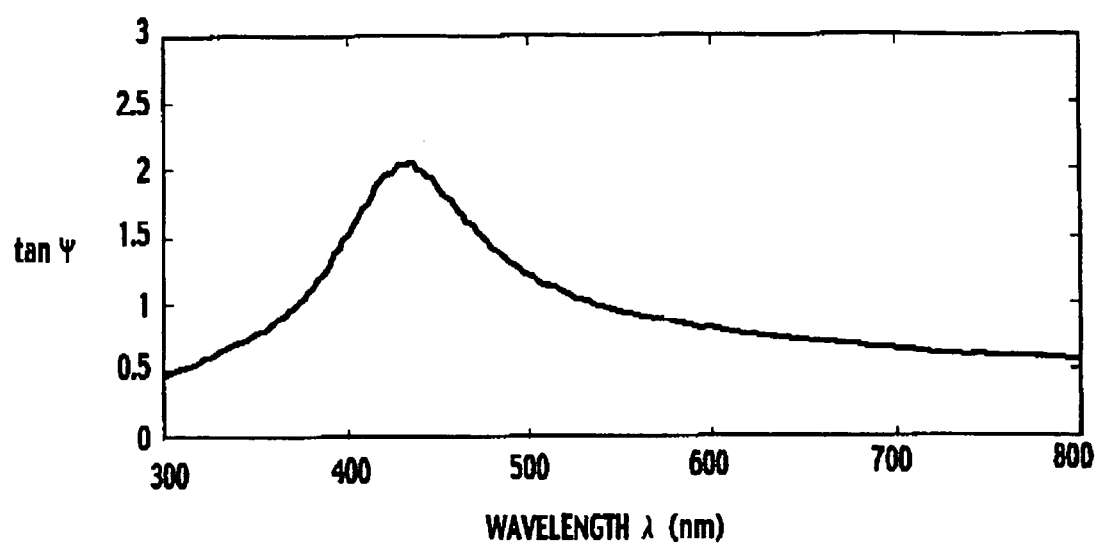
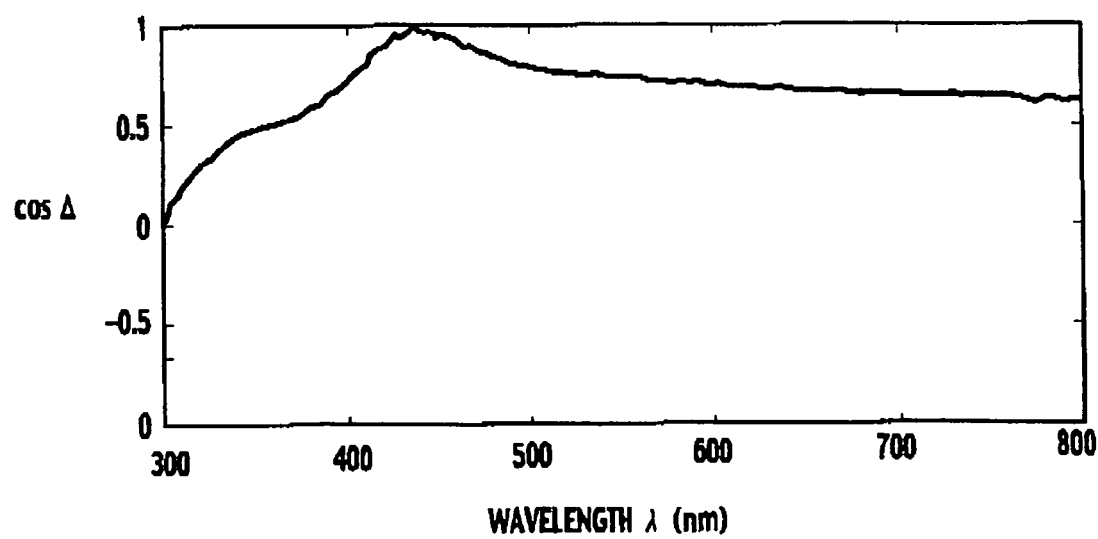

//METHOD FOR MONITORING FILM THICKNESS, A SYSTEM FOR MONITORING FILM THICKNESS, A METHOD FOR MANUFACTURING A SEMICONDUCTOR DEVICE, AND A PROGRAM PRODUCT FOR CONTROLLING FILM THICKNESS MONITORING SYSTEM

CROSS REFERENCE TO RELATED APPLICATIONS

This application claims benefit of priority under 35 USC 119 based on Japanese Patent Application No. P2003-314626 filed Sep. 5, 2003, the entire contents of which are incorporated by reference herein.

BACKGROUND OF THE INVENTION

1. Field of the Invention

The present invention relates to a computer implemented monitoring method for measuring a thickness of a thin film in a multi-layer structure. The present invention particularly relates to the method for measuring film thickness using computer integrated manufacturing (CIM) system, a sub system for measuring film thickness in the CIM system. Further, the present invention pertains to control programs for controlling the sub systems for measuring film thickness. Further, the present invention relates to a method of manufacturing a semiconductor device using in-line monitoring according to this method for measuring film thickness.

2. Description of the Related Art

As degree of integration density of semiconductor integrated circuits such as large-scale integrations (LSIs) becomes higher, the number of wiring layers in a multi-level interconnection become larger and larger. In a case in which there are eight metallic wiring layers, it may be general to deposit around thirteen to fourteen interlayer insulation films, which must be formed corresponding number of production stages. Thus in-line monitoring of film thickness of multi-layer structure is extremely important.

The earlier procedure of measuring film thickness of three-layers stacked structure by using a light interference type thickness-measuring tool will be described as a simple example, using flowcharts of FIGS. 1 to 3, and the data flow diagrams of FIG. 4.

(a) First, in a step S901, a first film is formed on a substrate. Next in a step S902, using a thickness-measuring tool 6, white incident light is irradiated onto the substrate having the first film formed thereon. In a step S903, the thickness measuring tool 6 disperses light reflected from the substrate into its component wavelengths using a spectroscope and detects the intensity of the reflected light at each resolved wavelength using a photo detector. Further, in a step S904, a sequence of light intensity data detected by the photo detector are stored so as to establish a profile (x: wavelength, y: intensity) of an actual measured reflection spectrum by a control computer of the thickness-measuring tool 6. The interference of light waves, which have been reflected at the front and back side of the first film (at two boundaries with different optical densities) leads to periodical amplifications and extinction in the spectrum of a white continuum light. For example, plotting the actual measured wavelength along the abscissa and reflected light intensity along the ordinate, in a wavelength range of 200 nm to 800 nm, there is a serpentine profile having two peaks and two valleys.

(b) Next, in a step S905, a plurality of theoretical profiles of the reflection spectrums are calculated at the first film's thickness range (ta~ta+Δta) registered in a first measurement recipe of the control computer of the thickness-measuring tool 6. Further, in a step S906, one of the profiles closest to the profile of the actual measured reflection spectrum of the first film attained in the step S904 is searched in the theoretical profiles of the reflection spectrums arithmetically calculated in the step S905. Then the thickness value, upon which the closest theoretical profile of the reflection spectrum to the actual measured reflection spectrum is derived, is determined as the film thickness $T_A$. Afterward, in a step S907, this film thickness value is expressed as a film thickness value $T_{A, L1, W1}$ of specific lots and wafers (Further, the film thickness value $T_{A, L1, W1}$ is stored away in a management server 9, as shown in FIG. 4).

(c) In a step S911 of FIG. 2, a second film is formed on the first film. Next, in a step S912, using the thickness-measuring tool 6, white incident light is irradiated onto the substrate having the second film formed thereon. In a step S913, the thickness-measuring tool 6 disperses light reflected from the substrate using the spectroscope and detects the intensity of the reflected light at each resolved wavelength using a photo detector. Further, in a step S914, a sequence of light intensity data detected by the photo detector are stored so as to establish a profile of an actual measured reflection spectrum by the control computer of the thickness-measuring tool 6. The profile of the actual measured reflection spectrum represents the reflection at the boundary of the first and second films and the reflection at the boundary of the substrate and the first film, and expresses a complex serpentine profile. Although results depend upon the relationships of the material parameters and film thickness, plotting the actual measured wavelength along the abscissa and reflected light intensity along the ordinate, in a wavelength range of 200 nm to 800 nm there is generally a serpentine profile having three to four peaks and three to four valleys.

(d) In a step S915, a plurality of theoretical profiles of the reflection spectrums are calculated. Here, in addition to the second film's thickness range (tb~tb+Δtb) registered in a second measurement recipe of the control computer of the thickness-measuring tool, the thickness range (ta~ta+Δta) of the first film which is underneath the second film, must be included in the calculation. Next, in a step S916, one of the profiles closest to the actual measured film reflection spectrum of the second film attained in the step S914 is searched in the theoretical profiles of the reflection spectrums arithmetically calculated in the step S915. Then the thickness value, upon which the closest theoretical profile of the reflection spectrum to the actual measured reflection spectrum is derived, is determined as the film thickness $T_B$. Afterward, in a step S917, this film thickness value is expressed as a film thickness value $T_{B, L1, W1}$ of specific lots and wafers (Further, the film thickness value $T_{B, L1, W1}$ is stored away in a management server 9, as shown in FIG. 4).

(e) In a step S921 of FIG. 3, a third film is formed on the second film. Next, in a step S922, using the thickness-measuring tool 6, white incident light is irradiated onto the substrate having the third film formed thereon. In a step S923, the thickness-measuring tool 6 disperses light reflected from the substrate using the spectroscope and detects the intensity of the reflected light at each resolved wavelength using a photo detector. Further, in a step S924, a sequence of light intensity data detected by the photo detector are stored so as to establish a profile of an actual measured reflection spectrum by the control computer of the thickness-measuring tool 6. The actual measured reflection spectrum represents the reflection at the boundary of the substrate and the first film, the reflection at the boundary of the first and second films, and the reflection at the boundary of the second and third films, and expresses a complex serpentine profile. Although results depend upon the relationships of the material parameters and film thickness, plotting the actual measured wavelength along the abscissa and reflected light intensity along the ordinate, in a wavelength range of 200 nm to 800 nm there is generally a serpentine profile having five peaks and five valleys.

(f) In a step S925, a plurality of theoretical profiles of the reflection spectrums are calculated. Here, in addition to the third film's thickness range (tc~tc+$\Delta$tc) registered in a third measurement recipe of the control computer of the thickness-measuring tool, the thickness range (ta~ta+$\Delta$ta) of the first film which is underneath the second film, and the thickness range (tb~tb+$\Delta$tb) of the second film which is underneath the third film must be included in the calculation. Next, in a step S926, one of the profiles closest to the actual measured reflection spectrum of the third film attained in the step S924 is searched in the theoretical profiles of the reflection spectrums arithmetically calculated in the step S925. Then the thickness value, upon which the closest theoretical profile of the reflection spectrum to the actual measured reflection spectrum is derived, is determined as the film thickness $T_C$. Afterward, in a step S927, this film thickness value is expressed as a film thickness value $T_{C, L1, W1}$ of specific lots and wafers (Further, the film thickness value $T_{C, L1, W1}$ is stored away in a management server 9, as shown in FIG. 4).

As put forth above, for measuring the film thickness of layered structures by earlier technology, and even in cases of measuring the topmost layer of a layered structure, the film thickness of the underlying layer also had to be measured. Put simply, in cases having a three-layers structure that results after forming the second film on the first film and the third film on the second film, aside from measuring the film thickness range (tc~tc+$\Delta$tc) of the third film, theoretical profiles of the reflection spectrums for film thickness ranges of the first (ta~ta+$\Delta$ta) and second (tb~tb+$\Delta$tb) thin films must also be calculated. So in this earlier methodology, compared with a measurement in which film thickness of a single layer is measured by calculating theoretical profiles of the reflection spectrums of the reflection spectrum at a film thickness range (tc~tc+$\Delta$tc) of a single layer in a structure such as the first film/substrate, in the measurement of a multi-layer structure, problems such as increased measurement time, and decreased measurement precision (occurrence of "value jump", etc.) will arise. In recent LSI, multi-layer structure above ten to thirteen layers have become the norm, and the calculation of all of the theoretical profiles of the reflection spectrums for film thickness ranges of underlying respective layers of these multi-layer structure uses up computer memory resources, bringing the need for an extremely long measurement time period.

Further, although it is also possible to insert dedicated extra semiconductor wafers for the exclusive purpose of measuring respective film thickness, and measure respective film thickness of the corresponding level in each of the process steps in which each of the thin films is formed, but rising manufacturing costs, in the manufacturing generation in which high priced large diameter semiconductor wafers are employed, becomes problematic. In a situation having a multi-layer structure of above ten to thirteen layers, inserting extra semiconductor wafers within underlying film leads to serious increases in manufacturing costs, when switching over to a 200 mm to 300 mm diameter semiconductor wafer.

Further, in a light interference type thickness methodology, it is impossible to measure precisely a multi-layer structure encompassing adjacent two layers, each having identical or extremely close refraction indice, or it will generate a drop in precision of the measurement.

SUMMARY OF THE INVENTION

An aspect of the present invention inheres in a method for monitoring a thickness of a subject film deposited on an underlying structure, the underlying structure contains at least one thin film formed on a substrate. Namely, the method includes (a) determining thickness data of the underlying structure before the subject film is formed on the underlying structure, and storing the thickness data of the underlying structure in a thickness memory, (b) measuring profile of optical spectrum of the subject film after the subject film is formed on the underlying structure, (c) reading the thickness data of the underlying structure from the thickness memory, (d) calculating a plurality of theoretical profiles of the optical spectrum of the subject film based upon corresponding candidate film thicknesses of the subject film, using a measurement recipe for the subject film and the thickness data of the underlying structure, and (e) searching one of the theoretical profiles of the optical spectrum of the subject film, which is closest to the measured profile of optical spectrum of the subject film so as to determine a thickness of the subject film by the closest theoretical profile.

Another aspect of the present invention inheres in a system for monitoring thickness of each layer in a multi-layer structure, encompassing (a) a thickness memory configured to store thickness data of each layer of a underlying structure, disposed under a subject film in the multi-layer structure, (b) an optical system configured to detect reflected light from a surface of the multi-layer structure, (c) a profile memory configured to store measured profile of optical spectrum of the subject film, the measured profile of optical spectrum being acquired by the optical system, (d) a measurement recipe memory configured to store measurement recipes of each layer of the multi-layer structure, (e) a calculation module configured to read thickness data of the underlying structure from the thickness memory, and calculate a plurality of theoretical profiles of the optical spectrum of the subject film based upon corresponding candidate film thicknesses of the subject film prescribed in the measurement recipe, for the subject film, and (f) a determination module configured to search one of the theoretical profiles of the optical spectrum of the subject film, which is closest to the measured profile of optical spectrum of the subject film so as to determine a thickness of the subject film by the closest theoretical profile.

Still another aspect of the present invention inheres in a method for manufacturing a semiconductor device having multi-layer interconnection. Namely, the method includes (a) forming a first film on an underlying structure, the underlying structure contains at least one thin film formed on a substrate, (b) determining thickness data of the first film and storing the thickness data of the first film in a thickness memory, (c) forming a second film on the first film, (d) measuring profile of optical spectrum of the second film after the second film is formed on the first film, (e) reading the thickness data of the first film and the underlying structure from the thickness memory, (f) calculating a plurality of theoretical profiles of the optical spectrum of the second film based upon corresponding candidate film thicknesses of the second film, using a measurement recipe for the second film and the thickness data of the first film and the underlying structure, and (g) searching one of the theoretical profiles of the optical spectrum of the second film, which is closest to the measured profile of optical spectrum of the second film so as to determine a thickness of the second film by the closest theoretical profile.

Still another aspect of the present invention inheres in a computer program product for controlling a monitoring system so as to monitor a thickness of a subject film deposited on an underlying structure, the underlying structure contains at least one thin film formed on a substrate, the monitoring system has a thickness memory storing the thickness data of the underlying structure, the thickness data is determined before the subject film is formed on the underlying structure. Namely, the program includes (a) instructions configured to measure optical spectrum of the subject film formed on the underlying structure, (b) instructions configured to read the thickness data of the underlying structure from the thickness memory, (c) instructions configured to calculate a plurality of theoretical profiles of the optical spectrum of the subject film based upon corresponding candidate film thicknesses of the subject film, using a measurement recipe for the subject film and the thickness data of the underlying structure, and (d) instructions configured to search one of the theoretical profiles of the optical spectrum of the subject film, which is closest to the measured profile of optical spectrum of the subject film so as to determine a thickness of the subject film by the closest theoretical profile.

BRIEF DESCRIPTION OF THE DRAWINGS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. Generally and as it is conventional in the representation of film thickness-measuring tools, it will be appreciated that the various drawings are not drawn to scale from one figure to another nor inside a given figure, and in particular that the layer thicknesses are arbitrarily drawn for facilitating the reading of the drawings.

FIG. 7A is a diagram showing the details of the data structure of the film thickness data of the first film, the data are stored in the thickness memory of the CIM server (measurement control server);

FIG. 7B is a diagram showing the details of the data structure of the film thickness data of the first and second films, the data are stored in the thickness memory of the CIM server;

FIG. 7C is a diagram showing the details of the data structure of the film thickness data of the first, second and third films, the data are stored in the thickness memory of the CIM server;

FIG. 8 is a diagram showing the details of the data structure of the film thickness data stored in the thickness memory of the CIM server, the data are sorted into corresponding measurement sites;

FIG. 9A is a diagram showing an example of actual measured reflection spectrums (measured profile of optical spectrums) for the first film stored in the profile memory of the measuring-tool-side computer in the thickness monitoring system according to the first embodiment;

FIG. 9B is a diagram showing an example of actual measured reflection spectrums for the first and second films stored in the profile memory of the measuring-tool-side computer in the thickness monitoring system according to the first embodiment;

FIG. 9C is a diagram showing an example of actual measured reflection spectrums for the first, second and third films stored in the profile memory of the measuring-tool-side computer in the thickness monitoring system according to the first embodiment;

FIG. 17A shows a wavelength dependence of the ratio ($\tan\psi$) of the intensity of the P-polarized and the S-polarized reflected lights measured by the third thickness-measuring tool (spectroscopic ellipsometer) according to the second embodiment;

FIG. 17B shows a wavelength dependence of the phase difference ($\cos\Delta$) between the P-polarized and the S-polarized reflected lights measured by the third thickness-measuring tool according to the second embodiment;

DETAILED DESCRIPTION OF THE EMBODIMENTS

In the following description specific details are set forth, such as specific materials, process and equipment in order to provide a thorough understanding of the present invention. It will be apparent, however, to one skilled in the art that the present invention may be practiced without these specific details. In other instances, well-known manufacturing materials, process and equipment are not set forth in detail in order not to unnecessary obscure the present invention.

Prepositions, such as "on", "over", "under", "beneath", and "normal" are defined with respect to a planar surface of the substrate, regardless of the orientation in which the substrate is actually held. A layer is on another layer even if there are intervening layers.

First Embodiment

Figure 1:
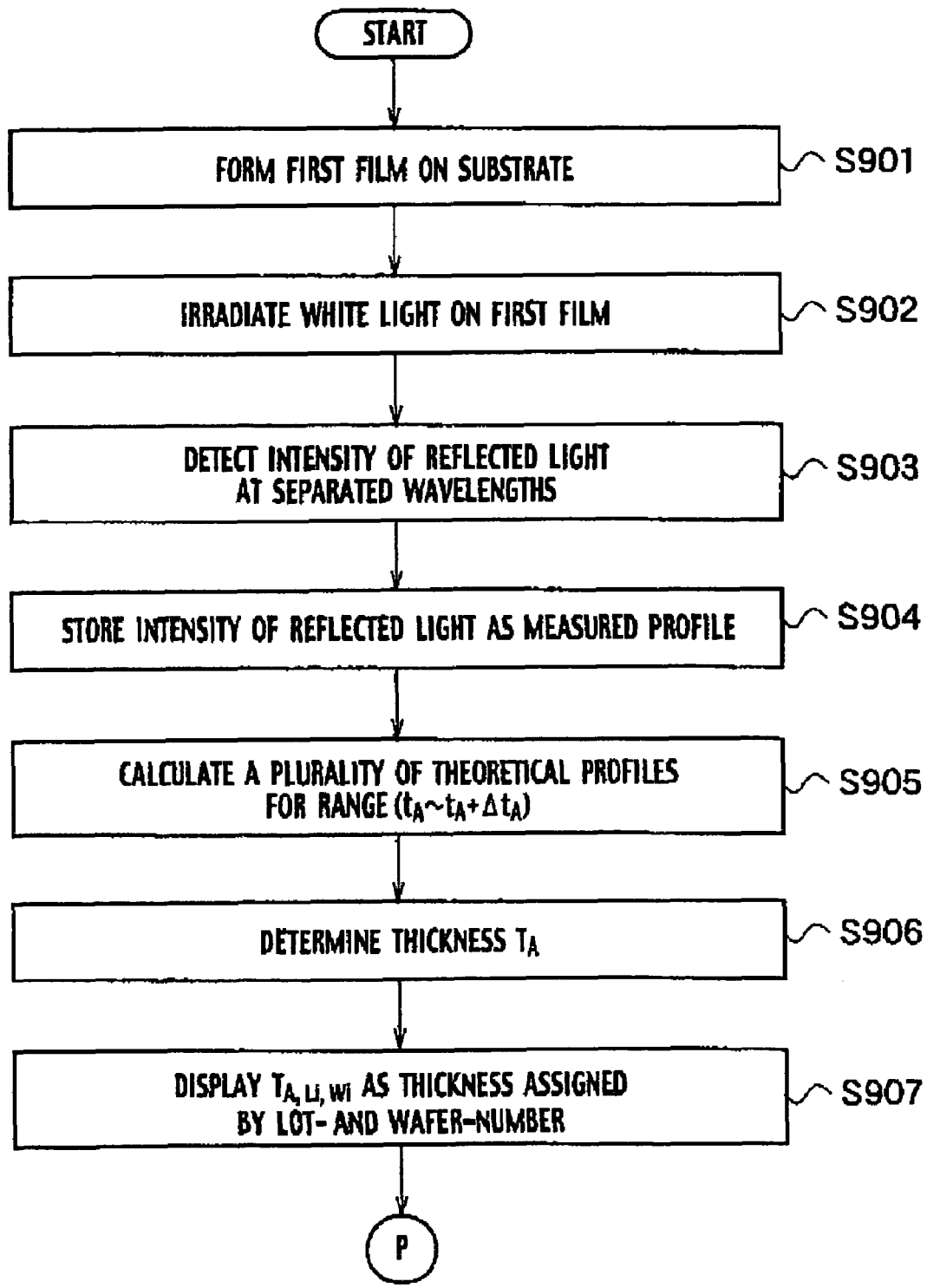
FIGS. 1 to 3 are flow charts so an earlier thickness monitoring method.
Figure 2:
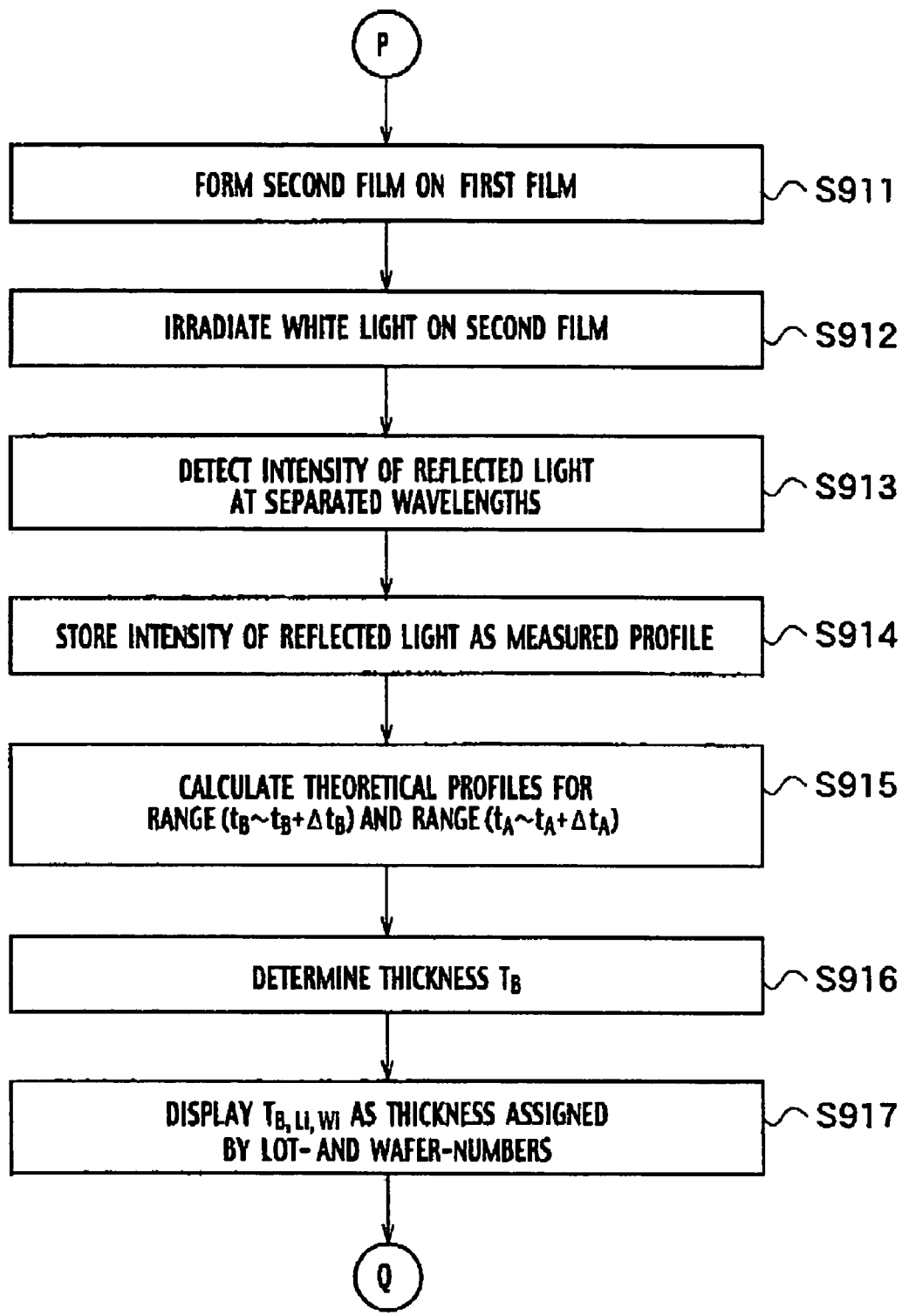
Figure 3:
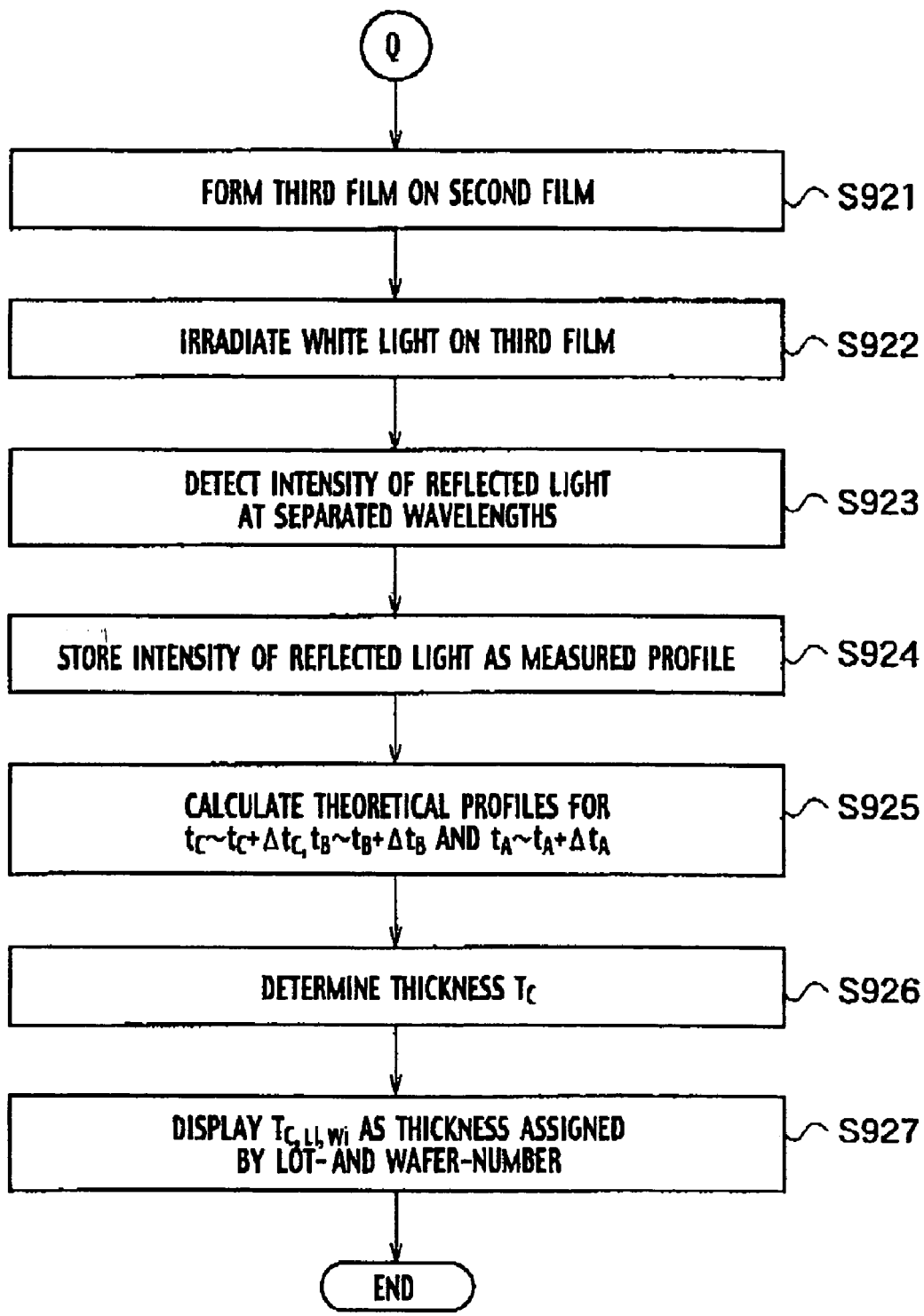
Figure 4:
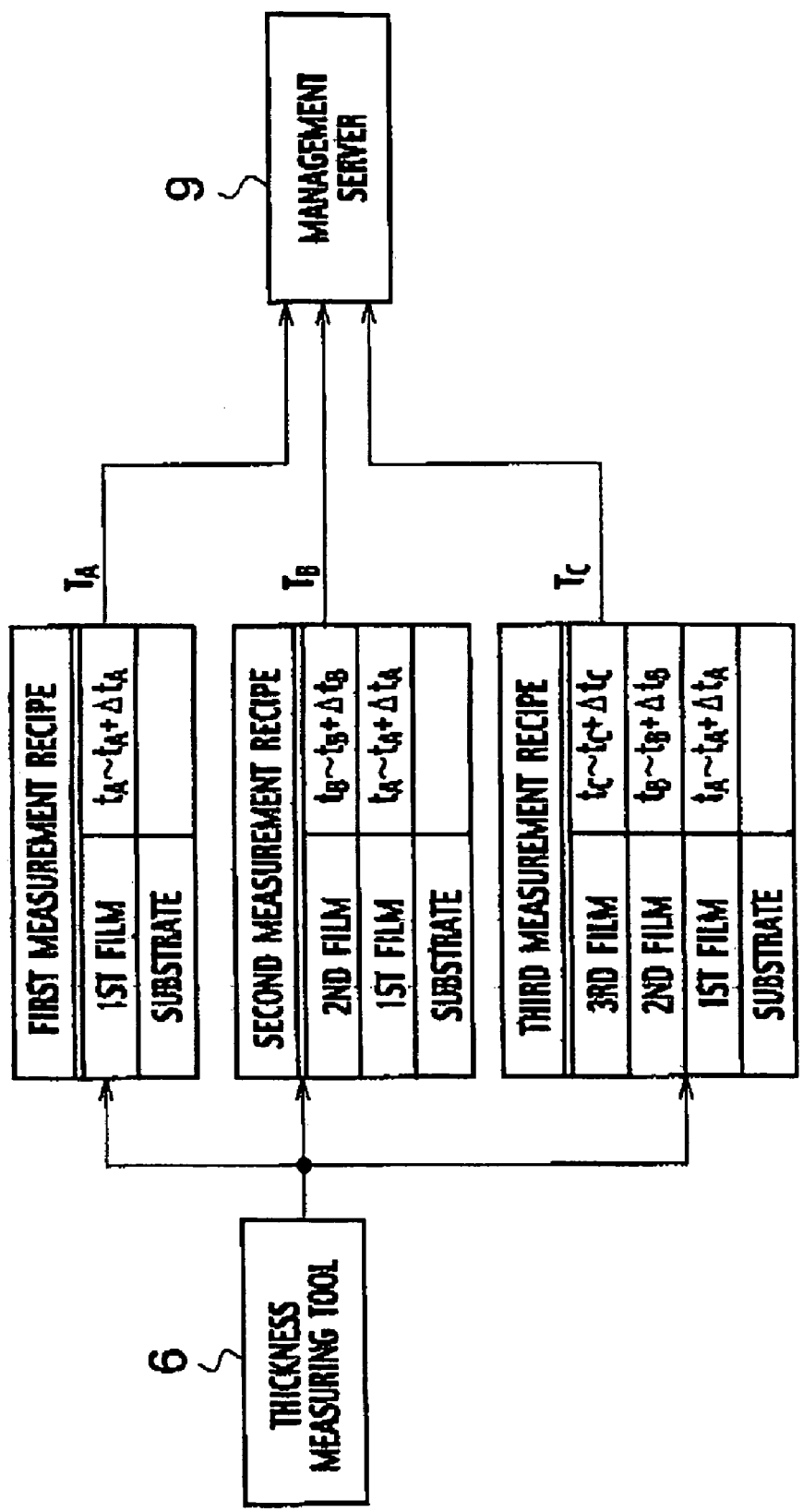
FIG. 4 is a data flow diagram showing the operation of an earlier thickness monitoring system which is adapted for executing in-line thickness monitoring of a three-layers structure.
Figure 5:
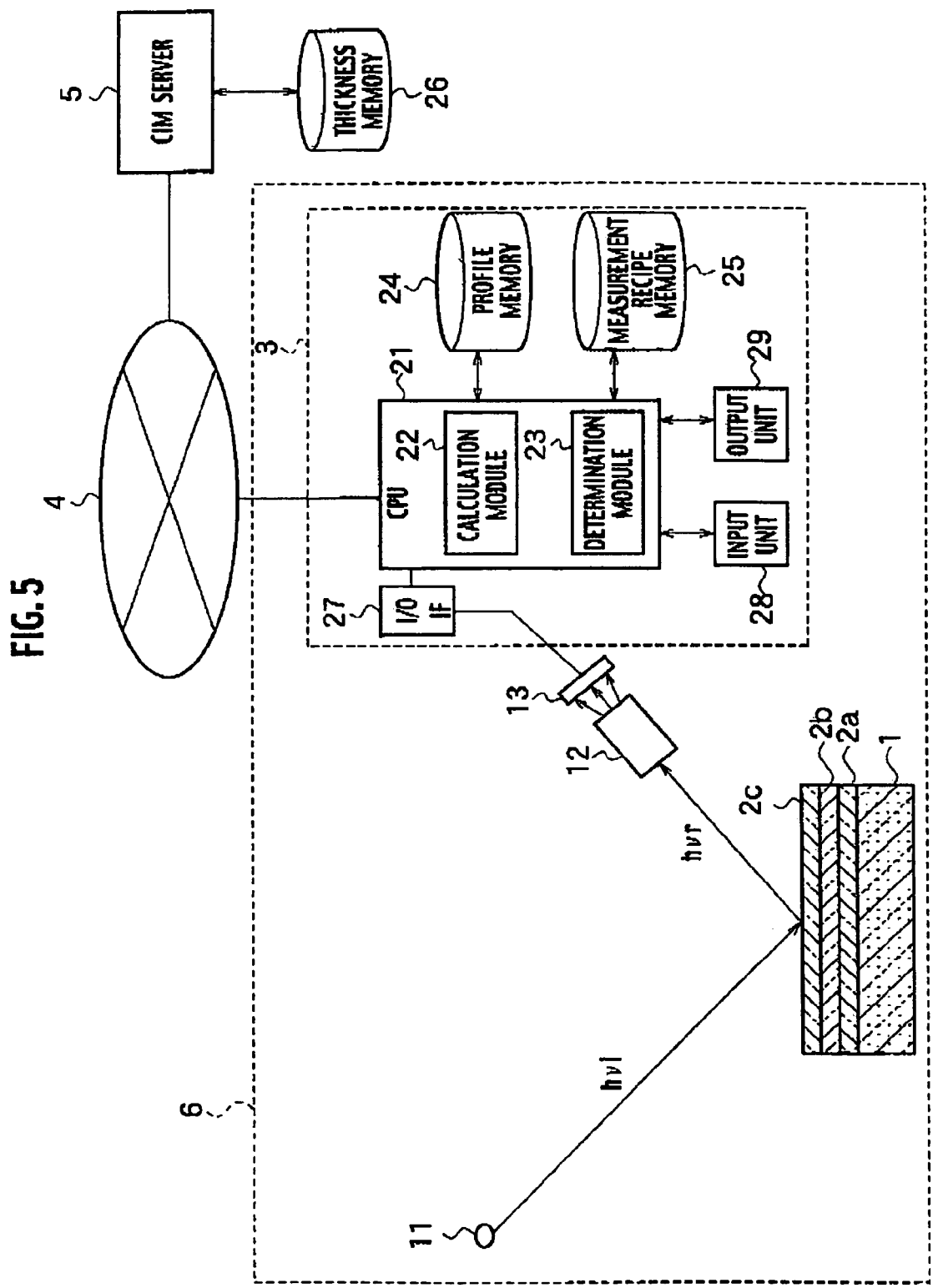
FIG. 5 is a rough sketch showing a thickness monitoring system, illustrating principally a thickness-measuring tool employed in the system, according to a first embodiment of the present invention.

As shown in FIG. 5, a thickness monitoring system according to a first embodiment of the present invention encompasses a thickness-measuring tool 6 and a CIM server (measurement control server) 5. The thickness-measuring tool 6 is connected to the CIM server 5 through a communication network 4 such as local area network (LAN). Namely, the thickness monitoring system of the first embodiment is a control system configured to control in-line monitoring of various thin films by a single thickness-measuring tool 6 and the CIM server 5. Here, the various thin films may include silicon oxide ($SiO_2$) films grown by thermal oxidation or deposited by chemical vapor deposition (CVD), sputtering, vacuum evaporation processes; phospho-silicate glass (PSG) films, boro-phosphate-silicate glass (BPSG) film, silicon nitride ($Si_3N_4$) film, and poly-silicon films deposited by CVD; and metallic films deposited by CVD, sputtering, or vacuum evaporation processes.

A thickness memory 26, which stores the film thickness value of each layer of a multi-layer film, is connected to the CIM server (measurement control server) 5. The thickness memory 26 records film thickness values $T_{A,LP,WQ,Sr}$, $T_{B,LP,WQ,Sr}$, $T_{C,LP,WQ,Sr}$, ... (p=1~m; q=1~n; r=1~k) sorted into each lot, each wafer within each lot, and each site within each wafer, as shown in FIGS. 7A, 7B, 7C and 8.

The thickness-measuring tool 6 is a light interference type thickness-measuring tool that includes the optical system made up by a light source 11 that irradiates a white incident light $hv_i$ to the surface of a substrate 1, a spectroscope 12 that breaks up the reflected light $hv_r$ from the surface of the substrate 1 into different component wavelengths, and a photo detector 13 that detects the intensity of the reflected light at each resolved component wavelength, as shown in FIG. 5. It is acceptable to use well-known diffraction grating type spectroscopes as well as prism type spectroscopes for the spectroscope 12. It is acceptable to use image sensors such as charge coupled device (CCD) image sensors as the photo detector 18. Further, although illustration has been omitted from FIG. 5, it is a matter of course that wafer stage and mechanism for driving the movement of wafer stage that support a semiconductor wafer on which a first film 2a, a second film 2b, a third film 2c are laminated in this order. Also, although a sample having a three-layers structure is shown in FIG. 5, it is a matter of course that after measurement of the sample having only the first film 2a deposited on the substrate 1, and after measurement of the sample having the first film 2a and the second film 2b deposited on the substrate 1, the three-layers structure is measured, in view of the nature of the in-line monitoring.

The output of the photo detector 13 is connected to a measuring-tool-side computer 3. Namely, the output of the photo detector 13 is connected to a central processing unit (CPU) 21 or arithmetic processor through an input/output interface 27. The CPU (arithmetic processor) 21 includes a calculation module 22, which calculates the optical profiles (x: wavelength, y: intensity) of the reflection spectrums, and a determination module 23, which compares actual measured reflection spectrum detected by the photo detector 13 with theoretical profiles of the reflection spectrums, and decides film thickness. Further, a profile memory 24, which stores spectrums of reflected light intensities detected by the photo detector 13, and a measurement recipe memory 25, which stores a measurement recipe, are connected to the CPU 21.

The measuring-tool-side computer 3 according to the first embodiment of the present invention further includes an input unit 28, which receives input such as data and commands from a user, and an output unit 29 that provides measurement results, as shown in FIG. 5. Although illustration has been omitted in FIG. 5, it is a matter of course that a data memory that has stored desired data necessary to the calculation of the calculation module 22, and a program memory that has stored film thickness measurement control and calculation programs, are also included therein. The data memory can be made up by random access memory (RAM) that stores input/output data, film thickness measurement parameters, as well as history data and data occurring in the midst of arithmetic computation, etc. The input unit 28 in FIG. 5 can be made of elements such as a keyboard, a mouse, a light pen, or a flexible disk device. It is possible for an operator in control of film thickness measurement to designate input output data, and set necessary parameters from the input unit 28. Further, through the input unit 28, it is possible to set film thickness measurement parameters such as the form of input output data, and it is also possible to feed commands for the execution or cessation of arithmetic computation. Also, printer devices or display devices are included on the output unit 29. The output unit 29 can display information such as input output data, measurement results, or film thickness measurement parameters. The thickness-measuring tool 6 in FIG. 5 shows a characteristic reflection spectrum for a layered structure like that shown in FIGS. 9A to 9C, when light reflected from the surface of the substrate 1 interferes with light reflected from interfaces of a multi-level film or interfaces between a film and the substrate 1. Because of this, the determination module 23 determines a film thickness according to comparing theoretical profiles (x: wavelength, y: intensity) of the reflection spectrums calculated by the calculation module 22 with a profile (x: wavelength, y: intensity) of the light intensity spectrum stored in the profile memory 24. The range of the wavelength used is 200 nm~800 nm, as shown in FIGS. 9A to 9C, for example. For instance, measurement can be carried out in a range from 20 nm to several dozen microns.

Figure 6:
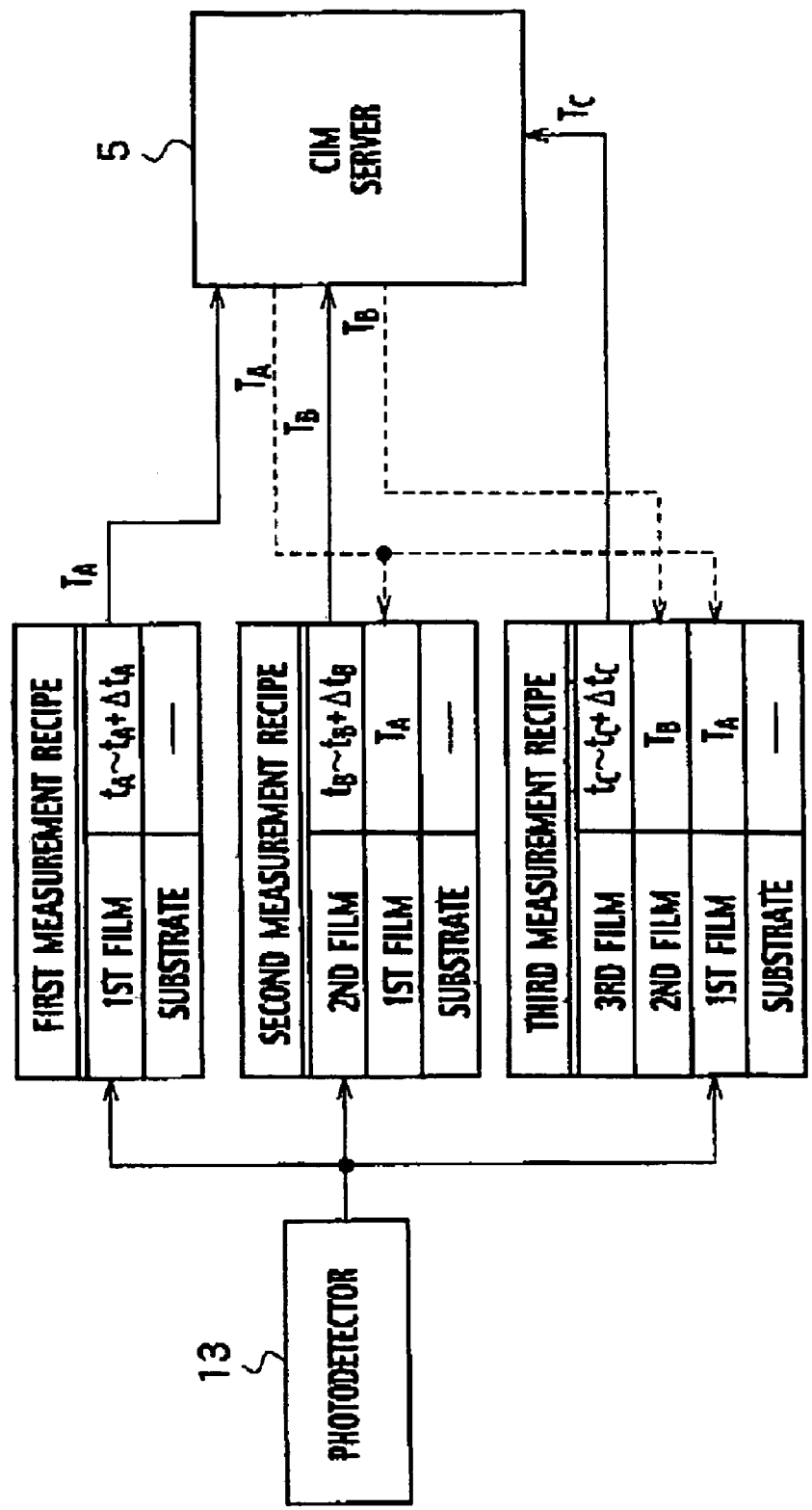
FIG. 6 is a data flow diagram showing the operation of the thickness monitoring system according to the first embodiment, which is adapted for executing in-line thickness monitoring of a three-layers structure.

FIG. 6 is a data flow diagram describing the operation of a thickness monitoring according to the first embodiment, which is adapted for measuring the film thickness of a three-layers structure made up of the first film 2a, the second film 2b, and the third film 2c. FIGS. 7A, 7B, 7C and 8 are diagrams describing the details of the film thickness data structure of the first film 2a, the second film 2b, and the third film 2c stored in the thickness memory 26.

The manufacturing process for semiconductor integrated circuits such as LSIs is generally carried out in units of lots. For example one lot is made up of 25 wafers. For example, in a case of a 200 mm φ wafer, each wafer has 9 to 13 measurement points (sites), and film thickness measurement is carried out at sites therein that have been pre appointed.

In the thickness monitoring system according to the first embodiment, data of the first film 2a, the second film 2b, and the third film 2c are sorted and stored in the thickness memory 26 of the CIM server (measurement control server) 5. However it is not necessarily essential that in-line monitoring is performed on all wafers of each lot, for example, it is a matter of course that sampling testing by choosing a representational number of wafers out of the 25 wafers of making up a lot, is also acceptable.

FIG. 7A shows a data structure where film thickness data of the first film 2a have been sorted and recorded in corresponding cells of a table, respectively. Each cell represents specific wafer in specific lot. For example, the film thickness values of a wafer 1, a wafer 2, a wafer 3, . . . , a wafer n of a lot 1 are sorted and recorded as $T_{A,L_1,W_1}$, $T_{A,L_1,W_2}$, $T_{A,L_1,W_3}$, . . . $T_{A,L_1,W_n}$. The film thickness va wafer 1, a wafer 2, a wafer 3, . . . , a wafer n of a lot 2 are sorted and recorded as $T_{A,L_2,W_1}$, $T_{A,L_2,W_2}$, $T_{A,L_2,W_3}$, . . . $T_{A,L_2,W_n}$. The film thickness values of a wafer 1, a wafer 2, a wafer 3, . . . , a wafer n of a lot 3 are sorted and recorded as $T_{A,L_3,W_1}$, $T_{A,L_3,W_2}$, $T_{A,L_3,W_3}$, . . . $T_{A,L_3,W_n}$. In the same manner, the film thickness values of a wafer 1, a wafer 2, a wafer 3, . . . , a wafer n of a lot m are sorted and recorded as $T_{A,Lm,W_1}$, $T_{A,Lm,W_2}$, $T_{A,Lm,W_3}$, . . . $T_{A,Lm,W_n}$. Even more specifically, the measured values are sorted into a plurality of sites in each of the wafers, and recorded in the corresponding cells of the table representing the specific site in the corresponding wafer, respectively, as shown in FIG. 8.

FIG. 7B shows film thickness data of the second film 2b. For example, the film thickness values of the wafer 1, the wafer 2, the wafer 3, . . . , the wafer n of the lot 1 are sorted and recorded as $T_{B,L_1,W_1}$, $T_{B,L_1,W_2}$, $T_{B,L_1,W_3}$, . . . $T_{B,L_1,W_n}$. The film thickness values of the wafer 1, the wafer 2, the wafer 3, . . . , the wafer n of the lot 2 are sorted and recorded as $T_{B,L_2,W_1}$, $T_{B,L_2,W_2}$, $T_{B,L_2,W_3}$, . . . $T_{B,L_2,W_n}$. The film thickness values of the wafer 1, the wafer 2, the wafer 3, . . . , the wafer n of the lot 3 are sorted and recorded as $T_{B,L_3,W_1}$, $T_{B,L_3,W_2}$, $T_{B,L_3,W_3}$, . . . $T_{B,L_3,W_n}$. In the same manner, the film thickness values of the wafer 1, the wafer 2, the wafer 3, . . . , the wafer n of the lot m are sorted and recorded as $T_{B,Lm,W_1}$, $T_{B,Lm,W_2}$, $T_{B,Lm,W_3}$, . . . $T_{B,Lm,W_n}$. Even more specifically, the measured values of each wafer are sorted into each site in the wafer and recorded, as shown in FIG. 8.

FIG. 7C shows film thickness data of the third film 2c. For example, the film thickness values of the wafer 1, the wafer 2, the wafer 3, . . . , the wafer n of the lot 1 are sorted and recorded as $T_{C,L_1,W_1}$, $T_{C,L_1,W_2}$, $T_{C,L_1,W_3}$, . . . $T_{B,L_1,W_n}$. The film thickness values of the wafer 1, the wafer 2, the wafer 3, . . . , the wafer n of the lot 2 are sorted and recorded as $T_{C,L_2,W_1}$, $T_{C,L_2,W_2}$, $T_{C,L_2,W_3}$, . . . $T_{C,L_2,W_n}$. The film thickness values of the wafer 1, the wafer 2, the wafer 3, . . . , the wafer n of the lot 3 are sorted and recorded as $T_{C,L_3,W_1}$, $T_{C,L_3,W_2}$, $T_{C,L_3,W_3}$, . . . $T_{C,L_3,W_n}$. In the same manner, the film thickness values of the wafer 1, the wafer 2, the wafer 3, . . . , the wafer n of the lot m are sorted and recorded as $T_{C,Lm,W_1}$, $T_{C,Lm,W_2}$, $T_{C,Lm,W_3}$, . . . $T_{C,Lm,W_n}$. Even more specifically, the measured values of each wafer are sorted into each site in the wafer and recorded, as shown in FIG. 8.

Further, it should be understood that the disclosure of FIGS. 7A, 7B, 7C and 8 do not mean that data structures of the first embodiment must be constructed by data, which are measured for all wafers of every lot in the in-line monitoring. Namely, since it is acceptable to execute sampling testing, by choosing a representational number of wafers out of the whole wafers making up a lot, it is possible to re-construct the data structure shown in FIGS. 7A, 7B, 7C and 8 with skipping wafer numbers instead of sequential wafer numbers. And it is a matter of course that is acceptable to execute sampling testing of specific lots instead of all lots.

Figure 10:
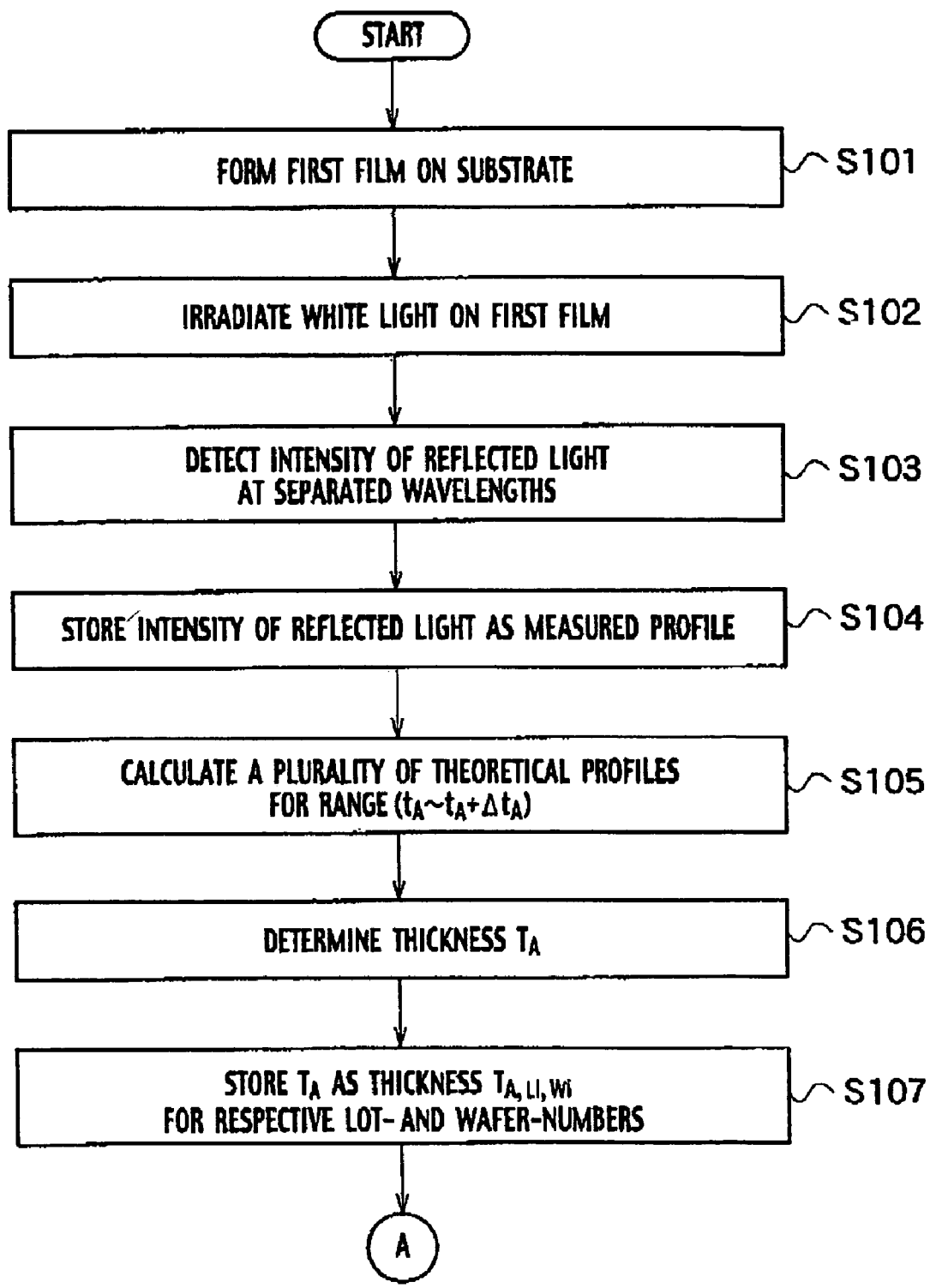
FIGS. 10 to 12 are flow charts describing a thickness monitoring method (in-line monitoring method) according to the first embodiment.

A thickness monitoring method (in-line monitoring method) according to the first embodiment will now be described while referencing data structures shown in FIGS. 7A, 7B, 7C and 8 and flowcharts of FIGS. 10, 11 and 12:

(a) First, the in a step S101 of FIG. 10, the substrate 1 is inserted into the interior of a reaction tube (or chamber) of a CVD furnace, and a silicon oxide film ($SiO_2$ film) having a thickness of 100 nm is formed on the substrate 1 as the first film 2a.

(b) Next, in a step S102, white incident light $hv_i$ is emitted from the light source 11 of FIG. 5 so as to irradiate the substrate 1 having the first film 2a formed thereon. Next, in a step S103, reflected light $hv_r$ from the substrate 1 is divided into component wavelengths by the spectroscope 12, which is implemented by a dispersing element such as a prism or grating. Further, the reflected light intensity of each separated wavelength is detected by the photo detector 13, sequentially in the order of resolved component wavelengths. Further, in a step S104, each of the light intensity detected sequentially by the photo detector 13 is stored into the profile memory 24 of the measuring-tool-side computer 3 so as to establish a profile of an actual measured reflection spectrum (measured profile of optical spectrum). An example of the established profile of the actual measured reflection spectrum is shown in FIG. 9A. In FIG. 9A, abscissa represents the wavelength of the reflected light, and ordinate represents the reflected light intensity. Measurement is carried out at a plurality of predetermined measurement points (sites) on a surface of each wafer, each wafer inside each lot, because the irradiation sites are previously assigned on a surface of each wafer, respectively. Then, the actual measured reflection spectrums (measured profile of optical spectrums are sorted and stored for each lot, each wafer inside each lot, and each site inside each wafer.

(c) Next, in a step S105, a plurality of theoretical profiles of the reflection spectrums are calculated by the calculation module 22, which is installed in the CPU 21 of the measuring-tool-side computer 3. Namely, a plurality of values that make up a range of candidate values of the film thickness of the first film 2a are fed into the calculation module 22, and several theoretical profiles of the reflection spectrums are arithmetically calculated by the calculation module 22. The calculations of these theoretical profiles of the reflection spectrums are executed in plural based upon the plural candidate values of the film thickness in the film thickness range (ta~ta+Δta) of the first film 2a that has been stored as the first measurement recipe in the measurement recipe memory 25 of the measuring-tool-side computer 3.

(d) Next, in a step S106, a profile close to the actual measured reflection spectrum of the first film 2a stored in the profile memory 24 is searched in the theoretical profiles of the reflection spectrums obtained in the above mentioned step S105. Then the variable, upon which the closest theoretical profile of the reflection spectrum to the actual measured reflection spectrum is generated, is decided as the film thickness $T_A$ of the first film 2a. Film thickness $T_A$ is determined for each lot, each wafer inside of each lot, and each site inside of each wafer.

(e) In a step S107, the film thickness $T_A$ is stored as the film thickness value $T_{A,LP,WQ,Sr}$, for each lot (p=1~m), each wafer (q=1~n), and each site (r=1~k) in the thickness memory 26 of the CIM server (measurement control server) 5. Namely, film thickness values are sorted into each lot, and each wafer, and are stored into the thickness memory 26 in the data structure shown in FIG. 7A.

Figure 11:
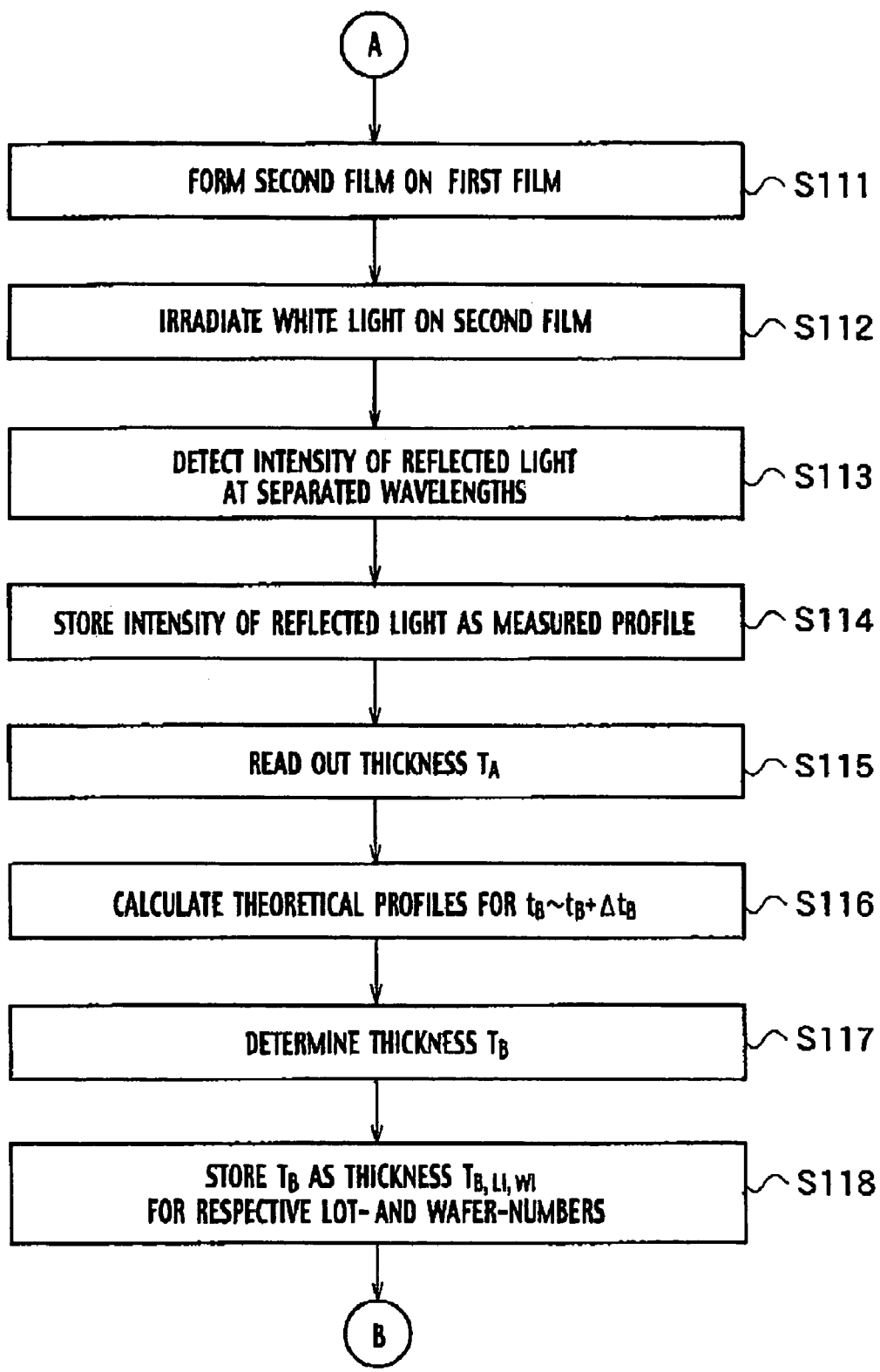

(f) Next in a step S111 of FIG. 11, a CVD furnace, a silicon nitride film ($Si_3N_4$ film) having a thickness of 100 nm is formed on the first film 2a as the second film 2b.

(g) Afterward in a step S112, white incident light $hv_i$ is irradiated from the light source 11 of FIG. 5 onto the substrate 1 having the second film 2b formed thereon. On the second film 2b, the irradiation sites of the incident light $hv_i$ toward the substrate 1 are aligned to the corresponding irradiation sites of the first film 2a in each wafer inside each lot so that identical irradiation sites are irradiated. That is, the locations of the irradiation sites of the incident light $hv_i$ toward the second film 2b are also previously assigned on a surface of each wafer. In a step S113, the reflected light $hv_r$ from the substrate 1 is divided into component wavelengths by the spectroscope 12. Further, the reflected light intensity of each separated wavelength is detected by the photo detector 13, sequentially in the order of resolved component wavelengths. Afterward, in a step S114, the reflected light intensity detected by the photo detector 13 is measured for each lot, each wafer inside of each lot, and each site inside of each wafer, and then stored in the profile memory 24 so as to establish a profile of an actual measured reflection spectrum (measured profile of optical spectrum). An example of the established profile of the actual measured reflection spectrum is shown in FIG. 9B. FIG. 9B expresses a reflection spectrum of the two-layers structure implemented by a silicon oxide film with a thickness of 100 nm and a silicon nitride film having a thickness of 100 nm formed on the silicon oxide film, abscissa represents wavelength of the reflected light and ordinate represents the reflected light intensity.

(h) Next in a step S115, the data of the film thickness value $T_{A,LP,WQ,Sr}$, of the underlying first film 2a for each lot (p=1~m), each wafer (q=1~n), and each site (r=1~k), that have been stored into the thickness memory 26 of the CIM server (measurement control server) 5, are read by the calculation module 22. Next in a step S116, the calculation module 22 calculates a plurality of theoretical profiles of the reflection spectrums using the film thickness range (tb~tb+Δtb) of the second film 2b, which is the measurement subject, that has been stored in the second measurement recipe of the measurement recipe memory 25. Namely, a plurality of thickness values that make up a range of candidate values of the film thickness of the second film 2b are transferred into the calculation module 22, and several theoretical profiles of the reflection spectrums are arithmetically calculated by the calculation module 22.

(i) Afterward, in a step S117, a profile close to the actual measured reflection spectrum of the second film 2b stored in the profile memory 24 is searched in the theoretical profiles of the reflection spectrums arithmetically calculated in the above mentioned step S116. Then the thickness value, upon which the closest theoretical profile of the reflection spectrum to the actual measured reflection spectrum is derived, is determined as the film thickness $T_B$ of the second film 2b in the step S117. The film thickness $T_B$ is stored as the film thickness value $T_{B,LP,WQ,Sr}$, for each lot (p=1~m), each wafer (q=1~n) and each site (r=1~k) in the thickness memory 26 of the CIM server (measurement control server) 5 in the step S118. Namely, film thickness values are sorted into each lot (p=1~m), each wafer (q=1~n) and each site (r=1~k), and are stored into the thickness memory 26 in the data structure shown in FIG. 7B.

Figure 12:
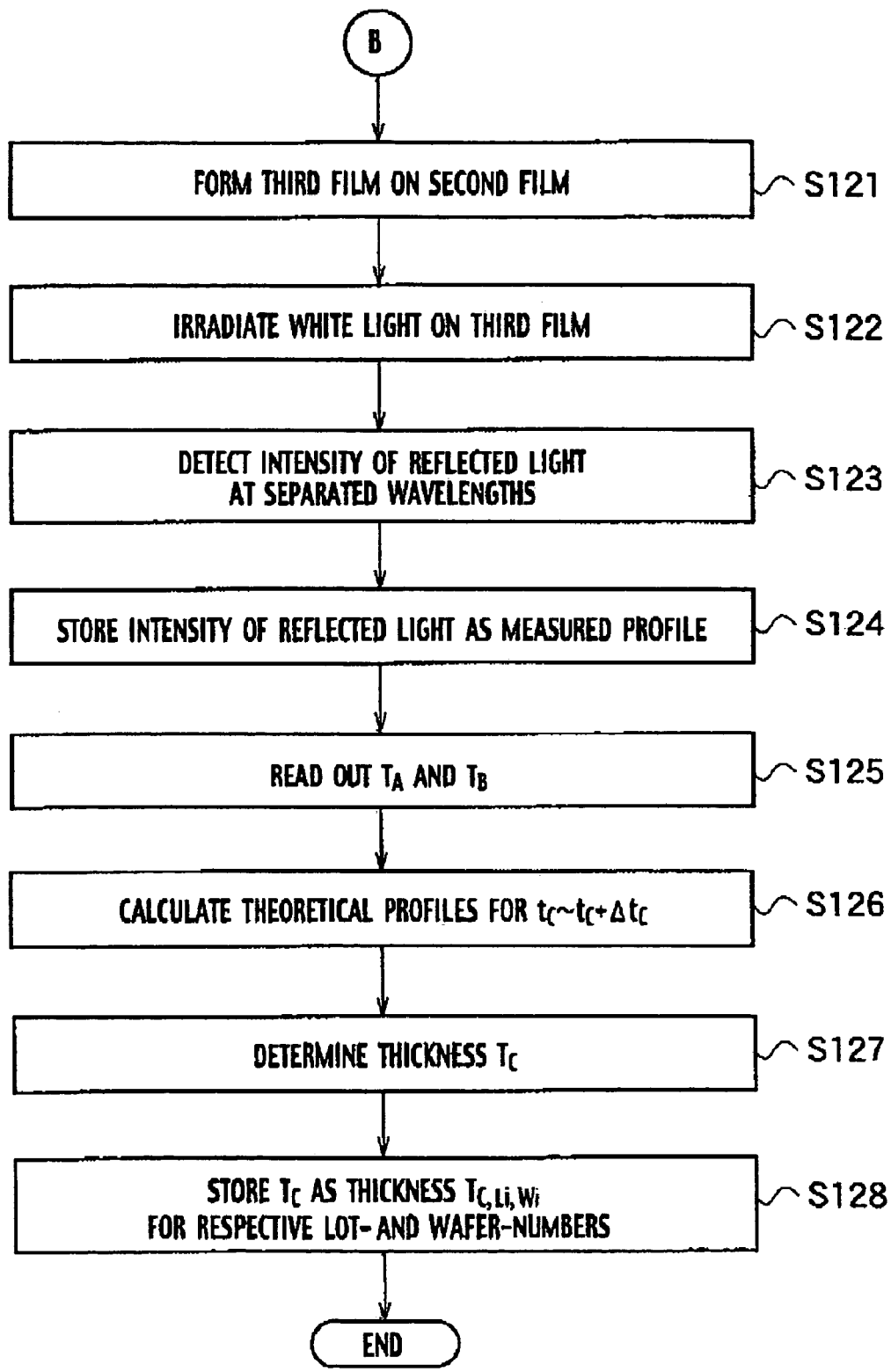

(j) Next in a step S121 of FIG. 12, using a CVD furnace, another silicon oxide film ($SiO_2$ film) having a thickness of 100 nm is formed on the second film 2b as the third film 2c.

(k) Afterward in a step S122, white incident light $hv_i$ is irradiated from the light source 11 of FIG. 5 onto the substrate 1 having the third 2c film formed thereon. The irradiation sites of the incident light $hv_i$ toward the substrate 1 are predetermined for each lot, each wafer inside each lot, and each site inside each wafer, corresponding to irradiation sites of the first film 2a and the second film 2b, so that identical points are irradiated. In a step S123, the reflected light $hv_r$, from the substrate 1 is divided into component wavelengths by the spectroscope 12. Further, the reflected light intensity of each separated wavelength is detected by the photo detector 13, sequentially in the order of resolved component wavelengths. Afterward, in a step S124, the reflected light intensity detected by the photo detector 13 is measured for each lot, each wafer inside of each lot, and each site inside of each wafer, and then stored in the profile memory 24 so as to establish a profile of an actual measured reflection spectrum (measured profile of optical spectrum). An example of the established profile of the actual measured reflection spectrum is shown in FIG. 9C. FIG. 9C expresses a reflection spectrum of the three-layers structure implemented by a silicon oxide film with a thickness of 100 nm, a silicon nitride film having a thickness of 100 nm formed on the silicon oxide film and another silicon oxide film with a thickness of 100 nm formed on the silicon nitride film, abscissa represents wavelength of the reflected light and ordinate represents the reflected light intensity.

(l) Next in a step S125, the data of underlying first film 2a and second film 2b for each lot (p=1~m), each wafer (q=1~n), and each site (r=1~k), that have been stored into thickness memory 26 of the CIM server (measurement control server) 5, put more plainly, the $T_{A,LP,WQ,Sr}$ (p=1~m; q=1~n; r=1~k) of the first film 2a, and the $T_{B,LP,WQ,Sr}$ (p=1~m; q=1~n; r=1~k) of the second film 2b are read by the calculation module 22. Next in a step S126, the calculation module 22 calculates a plurality of theoretical profiles of the reflection spectrums using the film thickness range (tc~tc+Δtc) of the third film 2c, which is the measurement subject, that has been stored in the third measurement recipe of the measurement recipe memory 25. Namely, a plurality of thickness values that make up a range of candidate values of the film thickness of the third film are transferred into the calculation module 22, and several theoretical profiles are arithmetically calculated by the calculation module 22.

(m) Afterward, in a step S127, a profile close to the actual measured reflection spectrum of the third film 2c stored in the profile memory 24 is searched in the theoretical profiles of the reflection spectrums arithmetically calculated in the above mentioned step S126. Then the thickness value, upon which the closest theoretical profile of the reflection spectrum to the actual measured reflection spectrum is derived, is determined as the film thickness $T_C$ of the third film 2c. The film thickness $T_C$ is stored as the film thickness value $T_{C,LP,WQ,Sr}$, for each lot (p=1~m), each wafer (q=1~n), and each site (r=1~k) in the thickness memory 26 of the CIM server (measurement control server) 5. Namely, film thickness values are sorted into each lot, and each wafer, and are stored into the thickness memory 26 in the data structure shown in FIG. 7C.

According to the thickness monitoring method associated with the first embodiment, for measuring film thickness of the top layer of a multi-layer structure, it is not necessary to measure the film thickness of underlying layers at the same time as in earlier technology. Namely, in a case in measuring the film thickness of the three-layers structure, which is made up of the third film 2c on the second film 2b, the second film 2b on the first film 2a, the first film 2a on the substrate 1, after the formation of the third film 2c, it is only necessary to measure one layer of the third film 2c. This is because all film thickness data underlying the true measurement subject layer of the third film 2c, which is prescribed by the measurement range (tc~tc+Δtc), the values $T_B$ of the second film 2b previously measured at the time of its formation, and the values $T_A$ of the first film 2a previously measured at the time of its formation, are read from the CIM server (measurement control server) 5 in the calculation of the thickness of the true measurement subject layer. Therefore, a plurality of theoretical profiles of the reflection spectrums are calculated for the film thickness range (tc~tc+Δtc) of the third film 2c of a one-layer structure, which can be construed as if a single layer of the third film 2c is laminated on the substrate 1, and the period of time of measurement, and measurement precision becomes equivalent to those of a single layer.

Although description of the three-layers structure has been put forth as an example, the technical advantages of the thickness monitoring method associated with the first embodiment become more significant for the measurement of multi-layer structure having more than four layers. In recent LSIs, multi-layer structures of above ten to thirteen layers have become commonplace, and using the thickness monitoring method associated with the first embodiment will achieve significant reductions in measurement time on multi-layer structure having particularly numerous layers.

Also, according to the thickness monitoring method associated with the first embodiment, it is possible to suppress increases in manufacturing costs because it becomes unnecessary to insert an extra semiconductor wafer for forming a subject thin film for the dedicated purpose of the in-line monitoring, in each of manufacturing stages where the subject thin film of the corresponding level is formed, respectively. And especially the effectiveness of the significant suppression of increases in manufacturing costs can be achieved by applying the thickness monitoring method of the first embodiment to multi-layer structure having particularly numerous layers.

Modification of the First Embodiment

In the thickness monitoring system shown in FIG. 5, the thickness-measuring tool 6 is connected to the CIM server (measurement control server) 5 through the communication network 4 such as LAN. However, in certain cases is possible to organize a thickness monitoring system, in which data required for the determination of the thickness are not transported through the communication network 4.

Figure 13:
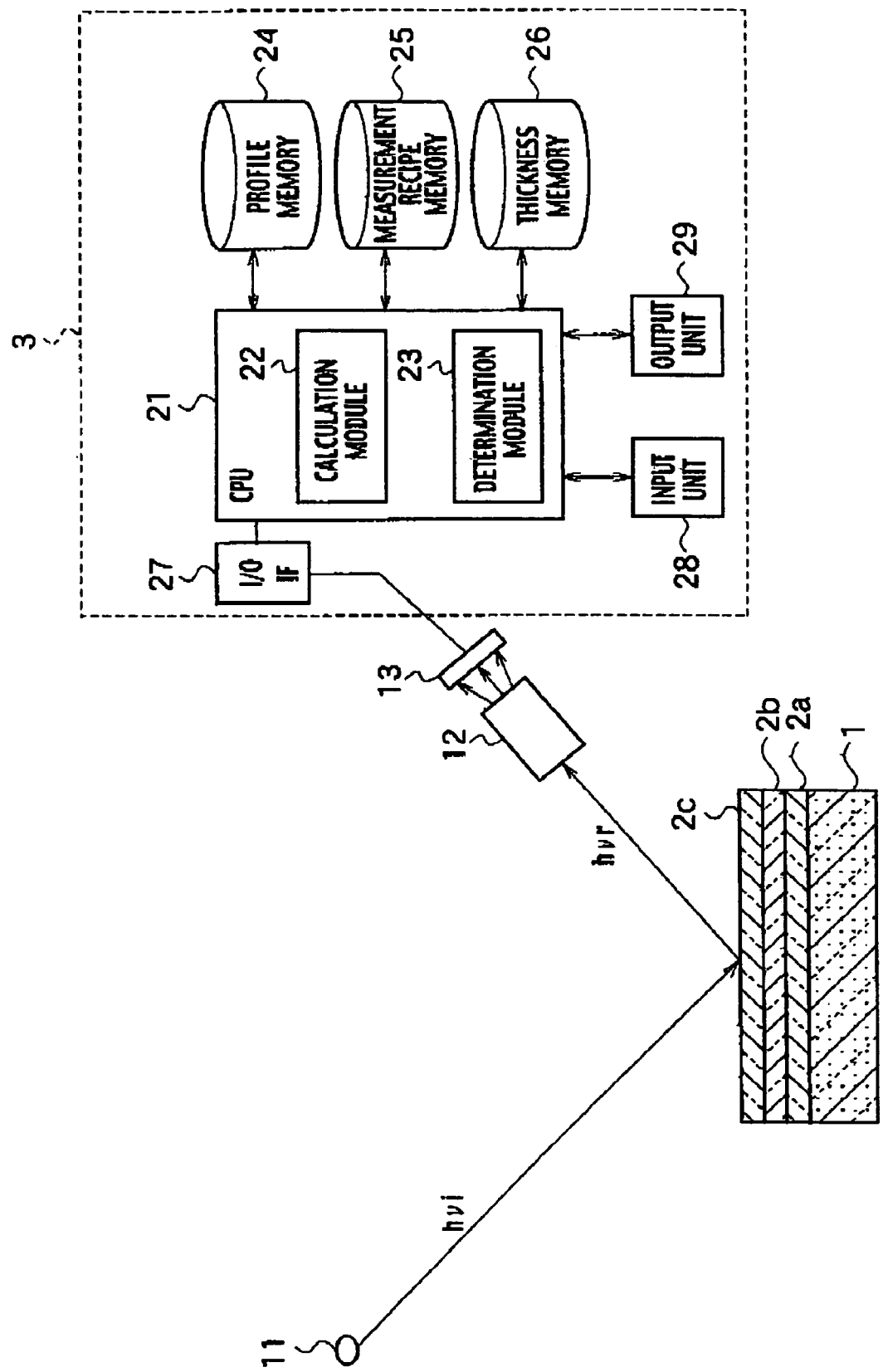
FIG. 13 is a rough sketch showing a thickness monitoring system, illustrating principally a thickness-measuring tool employed in the system, according to a modification of the first embodiment of the present invention.

FIG. 13 shows a configuration of a thickness monitoring system associated with a modification of the first embodiment of the present invention, which has an organization in which the measuring-tool-side computer 3 has the thickness memory 26, directly. The functions and operations of the respective hardware components of the thickness monitoring system, such as the CPU 21 and the optical system (12, 13), which sends actual measured reflection spectrums (measured profile of optical spectrums) to the film thickness calculation apparatus (measuring-tool-side computer) 3 are substantially same as the thickness monitoring system shown in FIG. 5, and thus redundant description will be omitted.

The thickness monitoring system according to the modification of the first embodiment, configured to perform the in-line thickness monitoring of a three-layers structure, operates in the substantially same manner of the data flow diagram shown in FIG. 6. Because of this, operation can basically be identical to that of the thickness monitoring system shown in FIG. 5, and thus can also achieve technical advantages that are also identical to that of the thickness monitoring system shown in FIG. 5. Namely:

(a) First, the CPU 21 of the measuring-tool-side computer 3 determines the film thickness $T_A$ of the first film 2a, and stores this film thickness $T_A$ into the thickness memory 26 of the measuring-tool-side computer 3 as $T_{A,LP,WQ,Sr}$, sorted into each lot (p=1~m), each wafer (q=1~n), and each site (r=1~k).

(b) Next, after forming the second film 2b on the first film 2a the CPU 21 of the measuring-tool-side computer 3 reads the film thickness value $T_{A,LP,WQ,Sr}$, (p=1~m; q=1~n; r=1~k) from the thickness memory 26. The CPU 21 then determines a film thickness $T_B$ of the second film 2b and stores this film thickness $T_B$ into the thickness memory 26 of the measuring-tool-side computer 3 as $T_{B,LP,WQ,Sr}$, sorted into each lot (p=1~m), each wafer (q=1~n), and each site (r=1~k).

(c) Next, after forming the third film 2c on the second film 2b, the CPU 21 of the measuring-tool-side computer 3 reads the film thickness value $T_{B,LP,WQ,Sr}$, (p=1~m; q=1~n; r=1~k) from the thickness memory 26. The CPU 21 then determines a film thickness $T_C$ of the third film 2c and stores this film thickness $T_C$ into the thickness memory 26 of the measuring-tool-side computer 3 as $T_{C,LP,WQ,Sr}$, sorted into each lot (p=1~m), each wafer (q=1~n), and each site (r=1~k).

In this manner, according to the thickness monitoring method (in-line monitoring method) of the modification of the first embodiment, it becomes possible to measure a multi-layer structure in the same amount of time it would take to measure a one-layer structure, with measurement precision being equal to that of one-layer structure measurement, and with lower measurement costs to around those of one-layer structure measurement. These technical advantages are achieved by the similar data flow diagram as shown in FIG. 6, in which storing and reading of the film thickness data $T_{A,LP,WQ,Sr}$, $T_{B,LP,WQ,Sr}$, $T_{C,LP,WQ,Sr}$ in and from the thickness memory 26 are executed with each measurement recipe in the CPU 21, without employing the CIM server 5 and the communication network 4.

Second Embodiment

Figure 14:
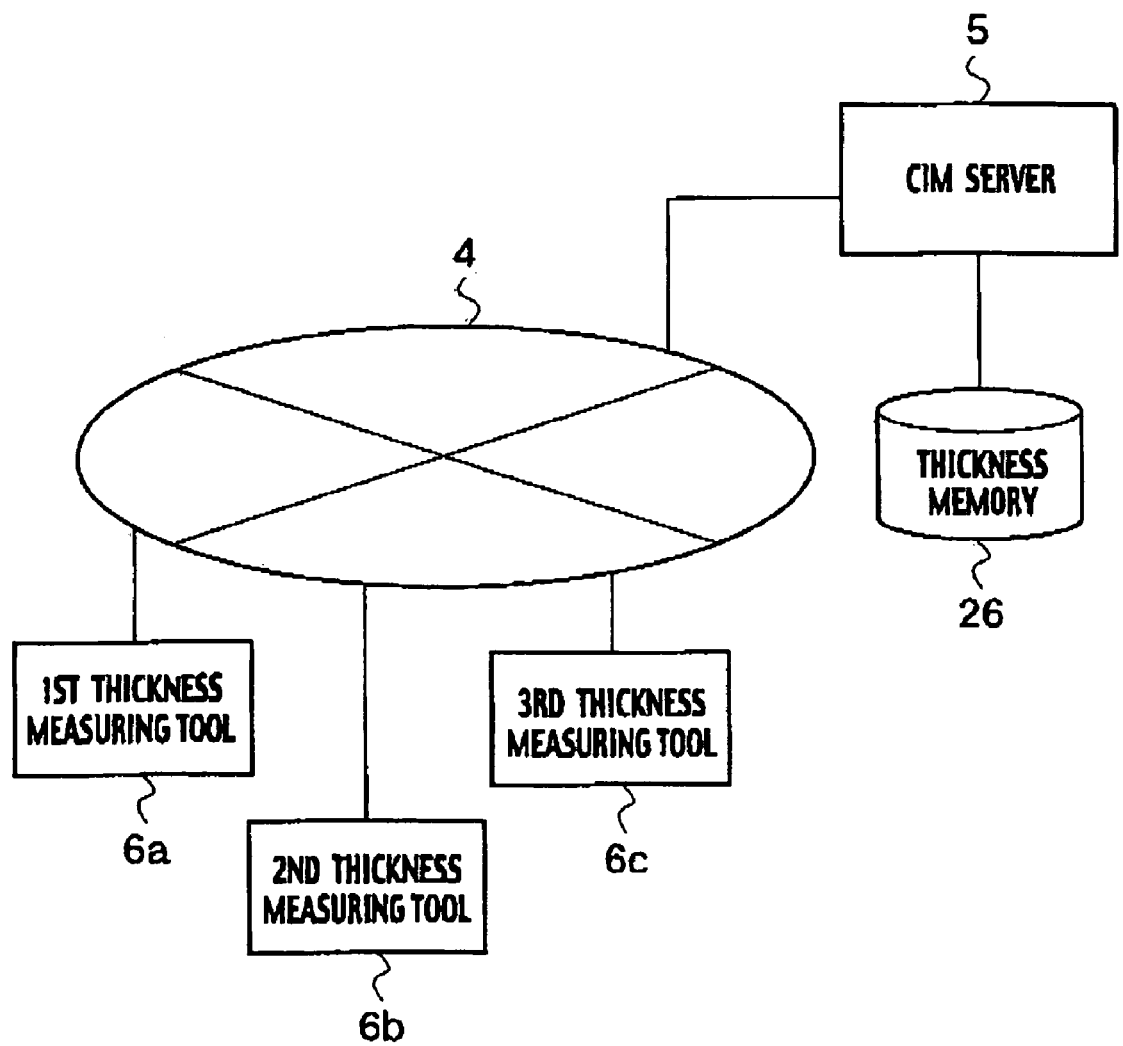
FIG. 14 is a rough sketch showing the thickness monitoring system, illustrating principally the connection relationships with a communication network, according to a second embodiment of the present invention.

As shown in FIG. 14, a thickness monitoring system according to a second embodiment of the present invention encompasses a plurality of thickness-measuring tools 6a, 6b, 6c, . . . , a CIM server (measurement control server) 5, and a communication network 4 such as LAN to which the thickness-measuring tools 6a, 6b, 6c, . . . and the CIM server are connected. Namely, in the thickness monitoring system of the second embodiment, the single CIM server (measurement control server) 5 controls the thickness-measuring tools 6a, 6b, 6c, . . . . A first thickness-measuring tool 6a, a second thickness-measuring tool 6b, and a third thickness-measuring tool 6c, . . . execute respectively in-line thickness monitoring of miscellaneous thin film formation processes of various thin films, which may include SiO2 films grown by steam (wet) oxidation, grown by dry oxidation, deposited by CVD, deposited by sputtering, deposited by vacuum evaporation; PSG film, BPSG film, $Si_3N_4$ film, and polysilicon films deposited by CVD; and metallic films deposited by CVD, sputtering, or vacuum evaporation.

Further, in FIG. 14, although measuring-tool-side computers are assumed to be installed respectively in the first thickness-measuring tool 6a, the second thickness measuring tool 6b, and the third thickness-measuring tool 6c, . . . , a system in which a common measuring-tool-side computer is externally connected to the first thickness-measuring tool 6a, the second thickness-measuring tool 6b, and the third thickness-measuring tool 6c; . . . can achieve the same function and effectiveness. That is, employing a single measurement recipe in the common measuring-tool-side computer, actual reflection spectrums measured respectively by optical systems of the first thickness-measuring tool 6a, the second thickness-measuring tool 6b, and the third thickness-measuring tool 6c, . . . , are analyzed respectively so as to determine corresponding film thicknesses for the first thickness-measuring tool 6a, the second thickness-measuring tool 6b, and the third thickness-measuring tool 6c, . . . .

All of the first thickness-measuring tool 6a, the second thickness-measuring tool 6b, and the third thickness-measuring tool 6c, . . . can be implemented by same kinds of thickness-measuring tools, which operate with same principle of thickness measurement method, or a thickness-measuring tool operating with different measurement principle from other thickness-measuring tools can be included partially in the thickness monitoring system of the second embodiment. It is also acceptable for all of the thickness-measuring tools to have different measurement principles.

Therefore, for example, in the thickness monitoring system according to the second embodiment, the first thickness-measuring tool 6a and the second thickness-measuring tool 6b are both described as being light interference type thickness-measuring tools, operating with the same principle as in the first embodiment, and the third thickness-measuring tool 6c is described as being a spectroscopic ellipsometer. Namely, in a case executing in-line thickness monitoring of a three-layers structure, the measurement of the first film 2a and the second film 2b is carried out by light interference type thickness-measuring tools, while the measurements of the third film is carried out by the spectroscopic ellipsometer shown in FIG. 16.

The spectroscopic ellipsometer used for the third thickness-measuring tool 6c includes a rotation-mechanism-equipped light polarizer 14 that sets incident light $hv_i$ from the light source 11 to a linearly polarized light of a desired rotational range (azimuth angle) θ around the optical axis, and a light analyzer 15 that fixes the rotational angle of the elliptical polarized light $hv_r$ reflected from the substrate 1 around the optical axis and transmits the light. This configuration is different from the light interference type thickness-measuring tool shown in FIG. 5. The light source 11, being a xenon (Xe) lamp or the like, the spectroscope 12 that breaks up light transmitted through the analyzer 15 into different component wavelengths, and the photo detector 13, are all basically identical to those of the light interference type thickness-measuring tool shown in FIG. 5, and thus redundant description thereof will be omitted. Also, the organization of the measuring-tool-side computer 3 of the second embodiment is basically the same as the organization of the measuring-tool-side computer 3 of the first embodiment, and thus redundant description thereof will be omitted.

Figure 16:
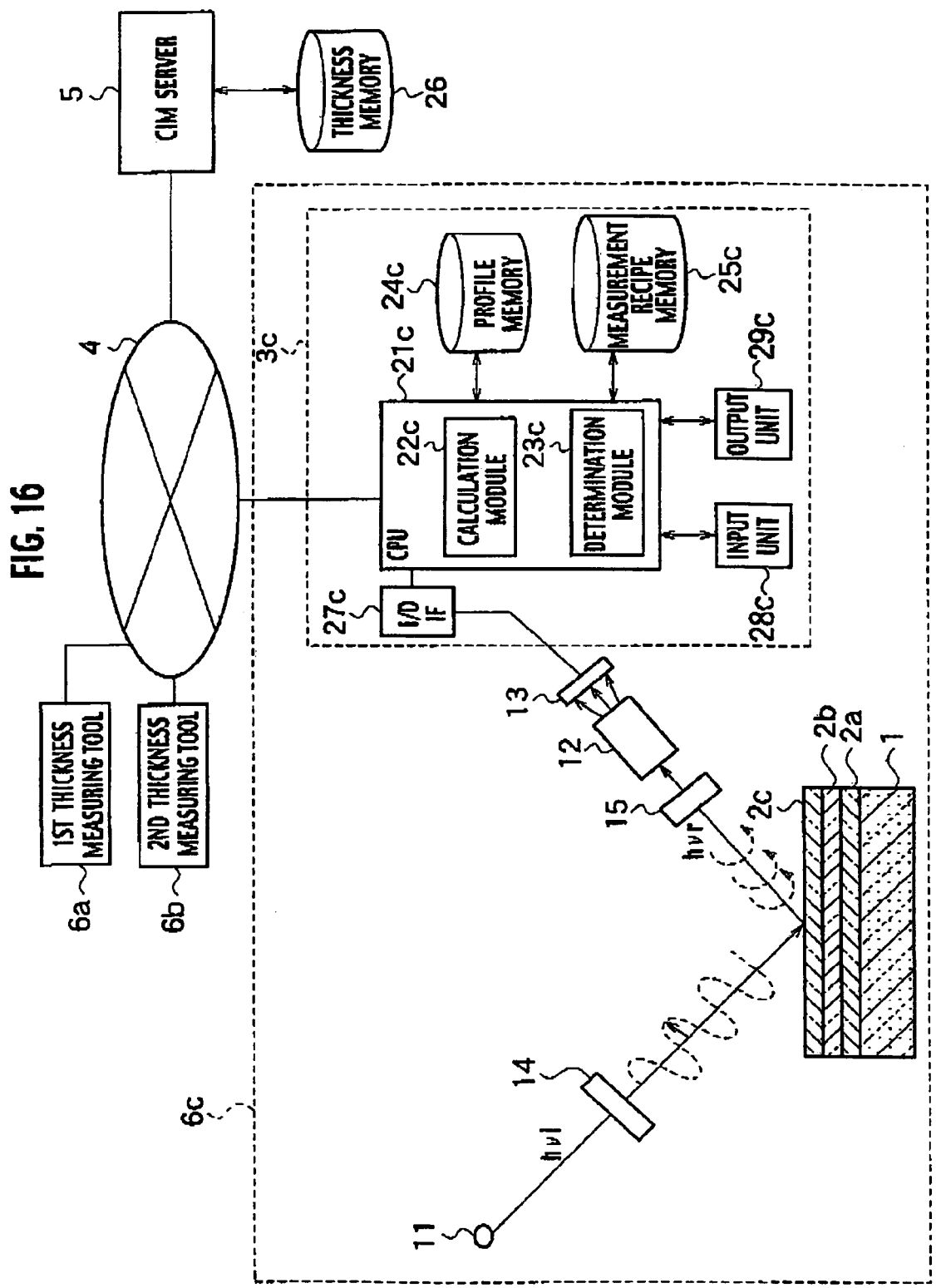
FIG. 16 is a rough sketch showing a thickness monitoring system, illustrating principally a third thickness-measuring tool employed in the system with first and second thickness-measuring tools, according to the second embodiment of the present invention.

As shown in FIG. 16, with the third thickness-measuring tool (spectroscopic ellipsometer) 6c, incident light $hv_i$ emitted from the light source 11 being not polarized becomes linearly polarized light with a rotational angle (azimuth angle) θ after passing through the polarizer 14, and incidents upon the surface of a sample at an incident angle φ. In the second embodiment, although the sample is a three-layers stacked structure made up by the first film 2a, the second film 2b, and the third film 2c, stacked on the substrate 1 in sequential order, it is not limited to the three-layers stacked structure. The rotational angle (azimuth angle) θ is determined by the setting angle of the polarizer 14. In the third thickness-measuring tool (spectroscopic ellipsometer) 6c, because the polarizer 14 and the analyzer 15 operated in conjunction, the rotational angle θ is automatically determined by setting the angle of the analyzer 15. On the other hand, the linearly polarized incident light $hv_i$ is reflected by the sample, changes of intensity and phase occur, and the linearly polarized incident light becomes elliptical polarized light. This elliptical polarized reflected light $hv_r$, passes through the analyzer 15 and is divided into component wavelengths by the spectroscope 12. The analyzer 15 detects the variation of transmission intensity and the ellipso-parameter such as the psi (ψ) and delta (Δ), which are caused by the rotation of the polarizer 14 rotates, and using these ellipso-parameter, creates the tanψ like that shown in FIG. 17A, and the cosΔ like that shown in FIG. 17B.

In FIG. 17A, abscissa represents wavelength λ, ordinate represents the ratio of the P-polarized light intensity $r_p$, and the S-polarized light intensity $r_s$ of the reflected light $hv_r$, as tanψ. Namely, tanψ is represented by the following equation:

$$\tan\psi = r_p/r_s \quad (1)$$

In FIG. 17B, abscissa represents wavlength λ, ordinate represents the phase difference of the P-polarized light, and the S-polarized light of the reflected light $hv_r$, as cosΔ. Namely, cosΔ is represented by the following equation:

$$\cos\Delta = (1/\tan\psi) \cdot M_1 \cdot M_2 \quad (2)$$

Here, $M_1$ represents a rotational parameter of the polarizer 14 with a 2×2 matrix made of a first row (cosθ, sinθ) and a second row (sinθ, cosθ), and $M_2$ represents the reflection coefficient of a sample with a 2×2 matrix made of a first row ($r_p$, 0) and a second row (0, $r_s$). The change of polarization amount (ψ, Δ) between the incident light $hv_i$ and the reflected light $hv_r$, proportional to the product of the film thickness and the optical constant, thus it is possible to arithmetically calculate film thickness.

For the optical system of the third thickness-measuring tool (spectroscopic ellipsometer) 6c, it is acceptable to use a combination of the light polarizer 14 that sets incident light $hv_i$ to a linearly polarized light of a desired rotational angle around the optical axis, and the analyzer 15 that fixes reflected light $hv_r$ from the substrate 1 to a rotational angle around the optical axis and transmits the light, it is also acceptable to use a combination of the light polarizer 14 that fixes the rotational angle around the optical axis and sets incident light $hv_i$ to a linearly polarized light, and the analyzer 15 that sets the reflected light $hv_r$ from the substrate 1 to a desired rotational angle around the optical axis and transmits the light.

Figure 15:
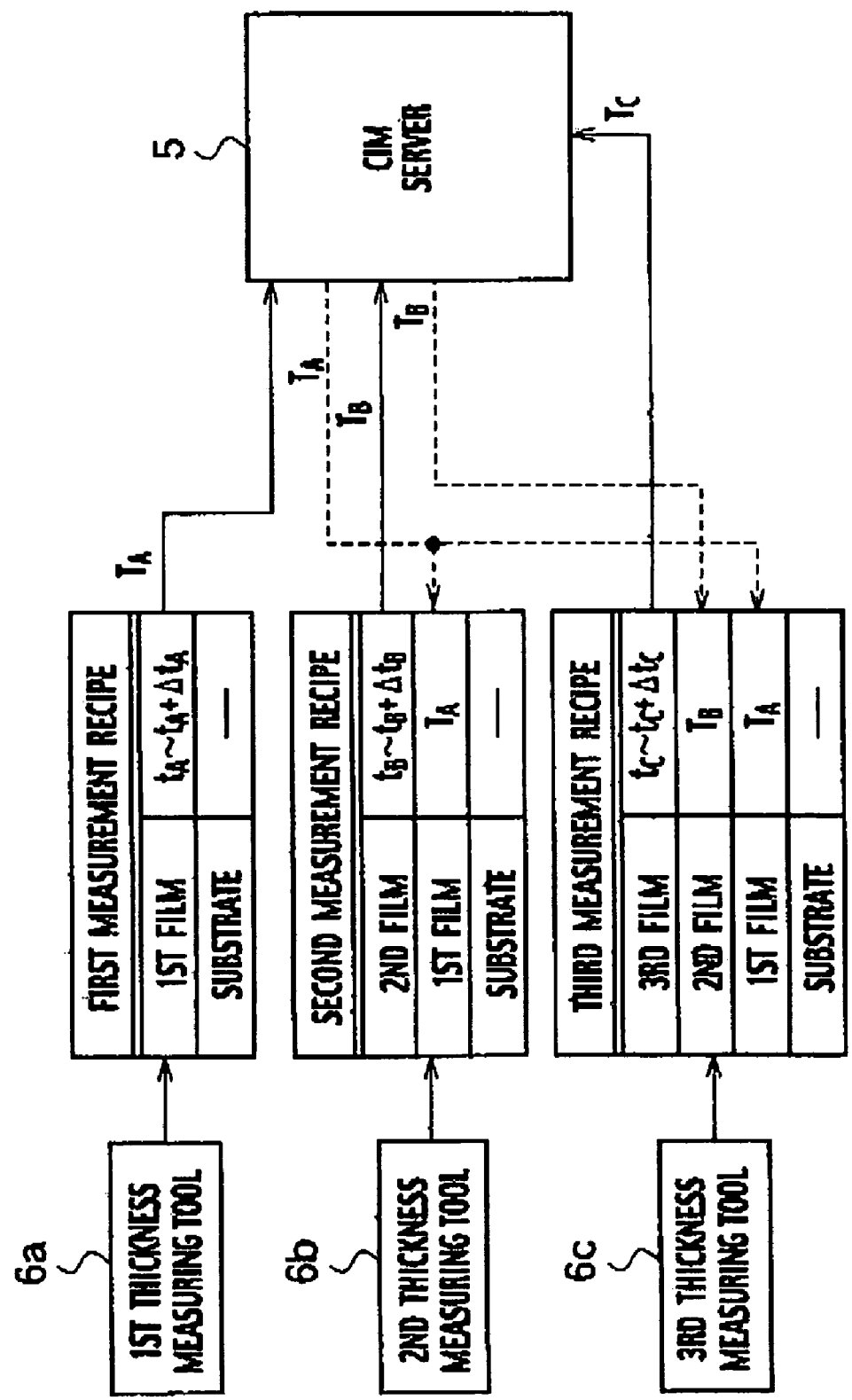
FIG. 15 is a data flow diagram showing the operation of the thickness monitoring system according to the second embodiment, which is adapted for executing in-line thickness monitoring of a three-layers structure.
Figure 18:
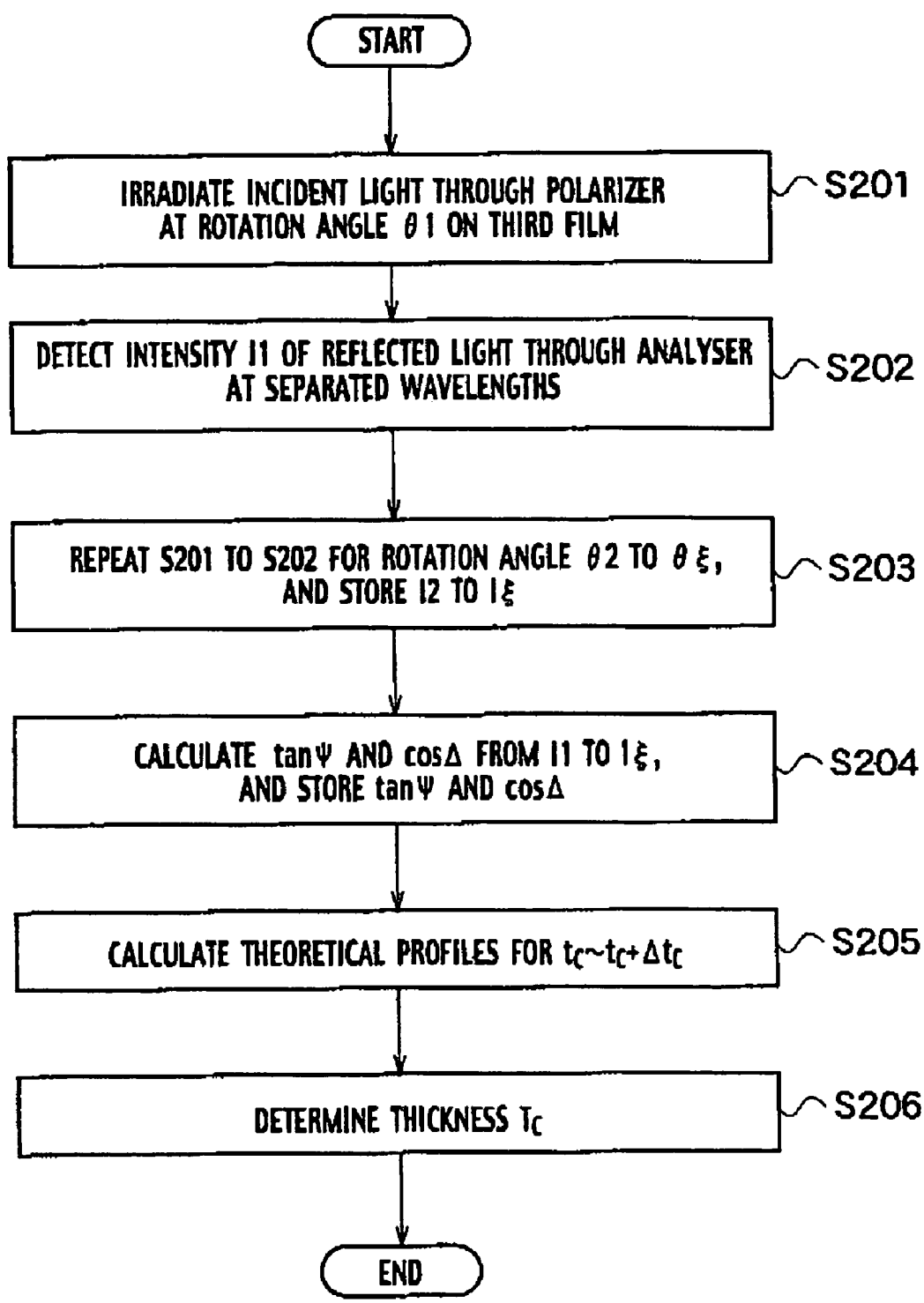
FIG. 18 is a flowchart showing the measurement procedure of the third thickness-measuring tool (spectroscopic ellipsometer) according to the second embodiment.

FIG. 15 is a data flow diagram describing the operation of a thickness monitoring system according to the second embodiment in a case executing in-line thickness monitoring of a three-layers structure. The measurements of the first film 2a and the second film 2b are carried out according to the procedures shown in FIGS. 10 and 11, but the measurement of the third film 2c is carried out according to the procedure shown in FIG. 18. A film thickness measuring method (in-line monitoring method) according to the second embodiment is described below:

(a) First the first film 2a is formed on the substrate 1. With the thickness-measuring tool 6a reflected light $hv_r$ is divided into component wavelengths by the spectroscope in the same manner as in the first embodiment, and light intensity detected by the photo detector is stored into the profile memory as a profile of actual measured reflection spectrum (measured profile of optical spectrum). A plurality of theoretical profiles of the reflection spectrums are calculated by the calculation module of the measuring-tool-side computer (the illustration is omitted from the FIG. 16, see the measuring-tool-side computer 3 shown in FIG. 5) that is provided within the first thickness-measuring tool 6a. The calculations of these theoretical profiles of the reflection spectrums are executed for a plurality of candidate film thicknesses, which lie in the film thickness range of the first film 2a (ta~ta+Δta) that has been stored in the first measurement recipe of the measurement recipe memory 25 of the measuring-tool-side computer 3 (see FIG. 5). And one of candidate film thicknesses, upon which the closest theoretical profile of the reflection spectrum to the actual measured reflection spectrum stored in the profile memory is generated, is determined as a film thickness $T_A$ for each lot, each wafer, and each site, and this film thickness $T_A$ is stored in the thickness memory 26 (see FIG. 16) of the CIM server (measurement control server) 5, as shown in FIG. 15.

(b) Next, the second film 2b is formed on the first film 2a and the film thickness of the second film 2b is determined using the second thickness-measuring tool 6b. In the determination of the film thickness of the second film 2b, as shown in FIG. 15, the measuring-tool-side computer 3 (illustration omitted, see FIG. 5) installed in the second thickness-measuring tool 6b reads the underlying film thickness $T_A$ stored in the thickness memory 26 of the CIM server (measurement control server) 5, and using the film thickness range (tb~tb+Δtb) of the second film 2b, a plurality of theoretical profiles of the reflection spectrums are calculated by the calculation module, and the film thickness $T_B$ is determined. Then, this film thickness $T_B$ is stored in the in the thickness memory 26 of the CIM server (measurement control server) 5 as shown in FIG. 15.

(c) The third film 2c is formed on the second film 2b. In a step S201, incident light from the light source 11 of FIG. 16 irradiates the substrate 1, having the third film 2c formed upon it, through the polarizer 14 that sets incident light $hv_i$ from the light source 11 to a linearly polarized light of a desired rotational angle (azimuth angle) around the optical axis. A plurality of irradiation sites of the incident light $hv_i$ set to a rotation angle θ1 toward the substrate 1, which are assigned on a surface of each wafer, are aligned to corresponding irradiation sites of the second film 2b, so that identical sites are irradiated.

(d) The reflected light $hv_r$ from the substrate 1 passes through the analyzer 15. The analyzer 15 fixes the rotational angle of the reflected light $hv_r$ around the optical axis. In a step S202, the reflected light $hv_r$ passing through the analyzer 15 is divided into component wavelengths by the spectroscope 12, and the intensity of the reflected light at each resolved component wavelength is detected by the photo detector 13, sequentially in the order of resolved component wavelengths. A plurality of light intensities I1 detected sequentially by the photo detector 13, which corresponds to the rotation angle θ1, are stored into the profile memory 24.

(e) In a step S203, the processes of the steps S201-S202 are repeated for the respective rotation angles θ2, θ3, . . . , θξ of the polarizer 14, and corresponding wavelength dependence of the reflected light intensities I1, I2, I3, . . . , Iξ. These sequence of the steps S201-S202 are repeated for each lot, each wafer inside of each lot, and each side inside of each wafer.

(f) In a step S204, based upon the rotation angles θ1, θ2, θ3, . . . , θξ of the polarizer 14, ellipso-spectrums (tanψ, cosΔ) from the reflected light intensities I1, I2, I3, . . . , Iξ detected by the photo detector 13 are calculated and stored into the profile memory 24 as actual measured ellipso-spectrums (tanψ, cosΔ). As examples of the set of profiles, the wavelength dependence of tanψ is shown in FIG. 17A, and the wavelength dependence of cosΔ is shown in FIG. 17B for one of rotation angles θ1, θ2, θ3, . . . , θξ.

(g) In a step S205, underlying film thickness data stored into the thickness memory 26, that is, the film thickness $T_{A,LP,WQ,Sr}$ (p=1~m; q=1~n; r=1~k) of the first film 2a and the film thickness $T_{B,LP,WQ,Sr}$ (p=1~m; q=1~n; r=1~k) of the second film 2b, of each lot (p=1~m), each wafer (q=1~n), and each site (r=1~k), are read out. Then, the calculation module 22 calculates a plurality of theoretical profiles of the ellipso-spectrums (tanψ, cosΔ) using the film thickness range (tc~tc+Δtc) of the third film 2c.

(h) In a step S206, one of profiles close to the actual measured ellipso-spectrums (tanψ, cosΔ) of the third film 2c stored in the profile memory 24 is searched in the theoretical profiles of the ellipso-spectrums (tanψ, cosΔ) arithmetically calculated in the above mentioned step S205. Then the thickness value, upon which the closest theoretical profile of the ellipso-spectrums (tanψ, cosΔ) to the actual measured ellipso-spectrums (tanψ, cosΔ) is derived, is determined as the film thickness $T_C$ of the third film 2c. The film thickness $T_C$ is stored as the film thickness value $T_{C,LP,WQ,Sr}$ for each lot (p=1~m), each wafer (q=1~n), and each site (r=1~k) in the thickness memory 26 of the CIM server (measurement control server) 5. Namely, film thickness values are sorted into each lot, and each wafer, and are stored into the thickness memory 26 as shown in FIG. 15.

In this manner, according to a thickness monitoring method (in-line monitor method) associated with the second embodiment, it becomes possible to carry out thickness monitoring even in cases of multi-layer structure in the same amount of time it would take to measure a one-layer structure, with measurement precision equaling that of one-layer structure measurement precision, and lower measurement costs to around those of one-layer structure film thickness measurement costs. This is accomplished by bi-directional data transportation between the CIM server 5 and each of measuring-tool-side computer 3, which is installed in the first thickness-measuring tool 6a, the second thickness-measuring tool 6b, the third thickness-measuring tool 6c, . . . , respectively, in the same manner as shown in FIG. 15.

Modification of the Second Embodiment

The communication network 4 such as LAN can have a plurality of thickness-measuring tools connected thereon, corresponding to many process steps of the manufacturing processes of semiconductor devices. Put plainly, a thickness monitoring system according to a modification of the second embodiment of the present invention is organized so that the plurality of thickness-measuring tool 6a, 6b, 6c, 6d . . . is connected to CIM server (measurement control server) 5 through the communication network (LAN) 4.

Figure 19:
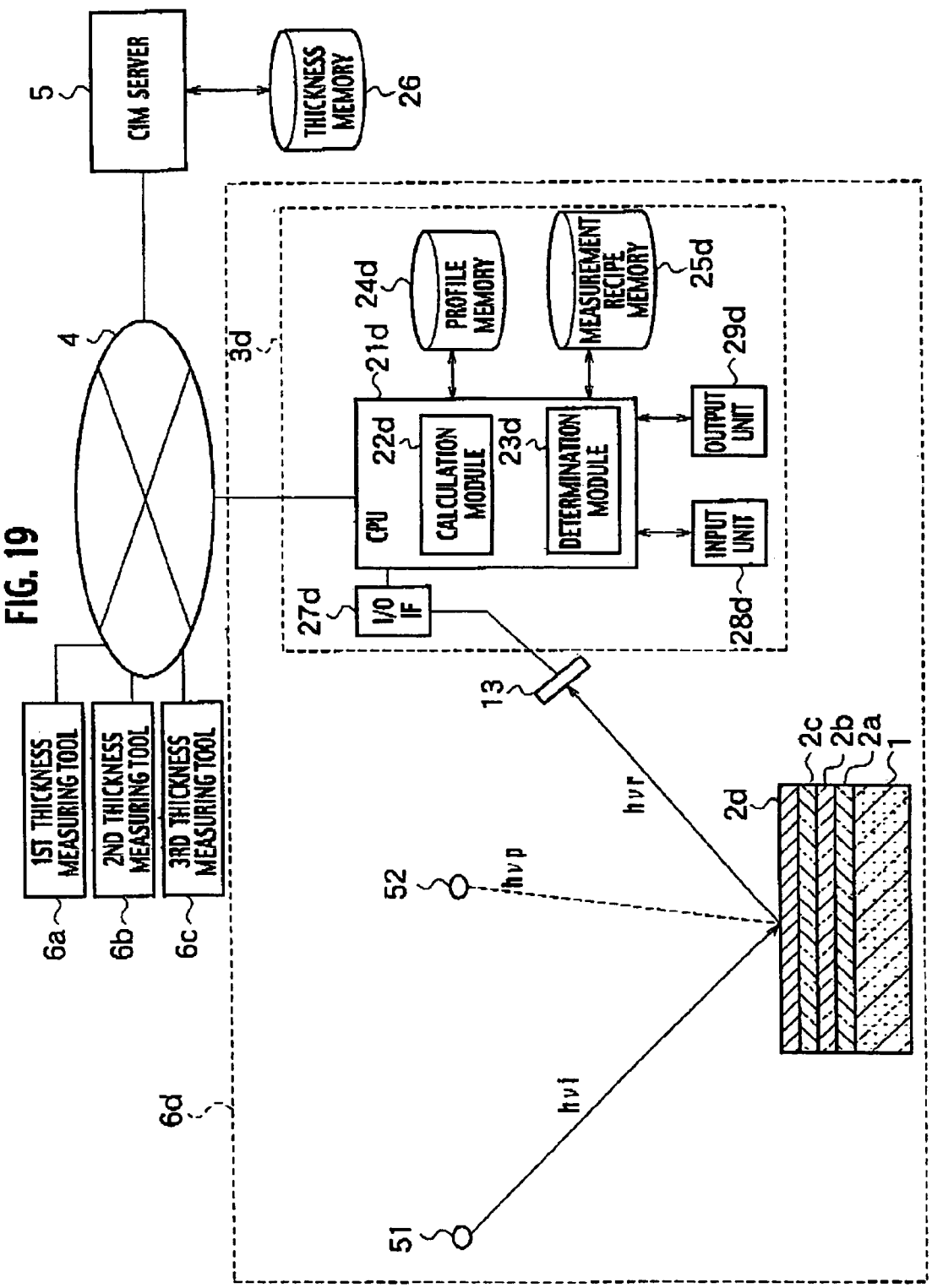
FIG. 19 is a rough sketch showing a thickness monitoring system, illustrating principally a forth thickness-measuring tool employed in the system with first, second and third thickness-measuring tools, according to a modification of the second embodiment of the present invention.

As shown in FIG. 19, the thickness monitoring system according to the modification of the second embodiment further encompasses, besides the first thickness-measuring tool 6a, the second thickness-measuring tool 6b, and the third thickness-measuring tool 6c, a fourth thickness-measuring tool 6d configured to measure the film thickness of a fourth film 2d. On the modification of the second embodiment, the fourth thickness-measuring tool 6d is an opto-acoustic type thickness-measuring tool. Namely, the thickness monitoring system according to the modification of the second embodiment explains a case in which a metallic film 2d is deposited as a fourth layer on the three-layers structure described above, and the thickness of the metallic film 2d is measured. It is acceptable that the measurement methodology of the first thickness-measuring tool 6a, the second thickness-measuring tool 6b, and the third thickness-measuring tool 6c be light interference type, spectroscopic ellipsometer, or some other types of film thickness measurement.

The opto-acoustic type thickness-measuring tool used as the fourth thickness-measuring tool 6d includes a probing laser (first light source) 51 configured to irradiate incident light $hv_i$ (probe light) onto the surface of the sample having the fourth film (metallic film) 2d formed thereon, and an exciting laser (second light source) 52 configured to irradiate incident light $hv_p$ (excitation light) in pulse form overlapping with the incident light $hv_i$ (probe light) irradiated from the probing laser 51, these features are different from the configuration of the light interference type thickness-measuring tools shown in FIG. 5. Further, in order that the reflected light from the surface of the sample having the fourth film (metallic film) 2d formed thereupon can be detected, the photo detector 13 is provided in the opto-acoustic type thickness-measuring tool.

The fourth thickness-measuring tool 6d according to the modification of the second embodiment further embraces a measuring-tool-side computer 3d. The measuring tool-side computer 3d includes CPU 21d, which encompasses a calculation module 22d configured to calculate theoretical profiles of the reflection spectrums, and a determination module 23 configured to compare actual measured reflection spectrum detected by the photo detector 13 with theoretical profiles of the reflection spectrums, and decides film thickness. Further, a profile memory 24d, which stores spectrums of reflected light intensities detected by the photo detector 13, and a measurement recipe memory 25d, which stores a measurement recipe, are connected to the CPU 21d. The measuring-tool-side computer 3d further includes an input unit 28d, which receives input such as data and commands from a user, an output unit 29d that provides measurement results, and I/O interface 27d. The other organization and features of the measuring-tool-side computer 3d according to the modification of the second embodiment are basically the same as those of the measuring-tool-side computer 3 shown in FIG. 5, and thus redundant description thereof will be omitted.

Figure 21:
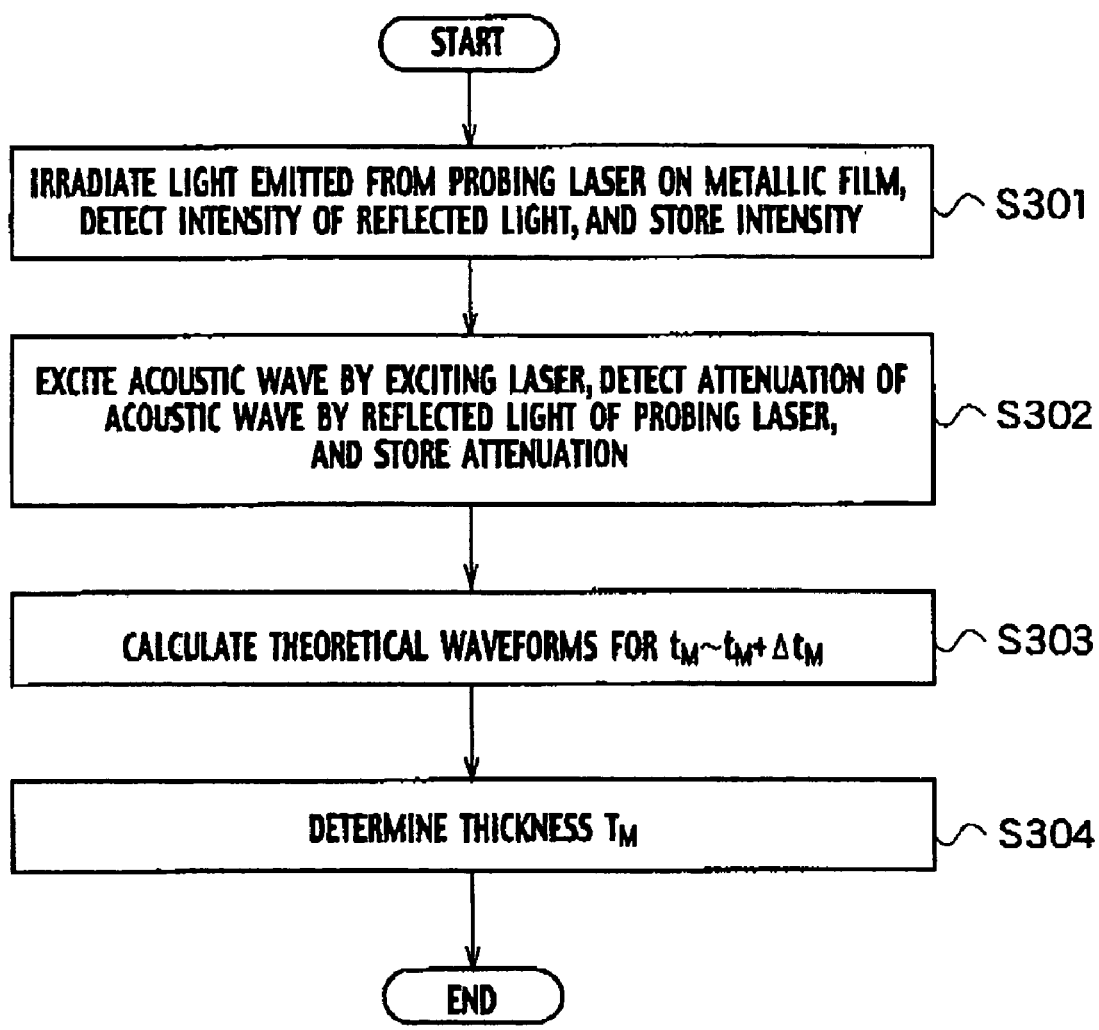
FIG. 21 is a flow chart showing the measurement procedure of the fourth thickness-measuring tool (opto-acoustic type thickness-measuring tool) according to the second embodiment.
Figure 22:
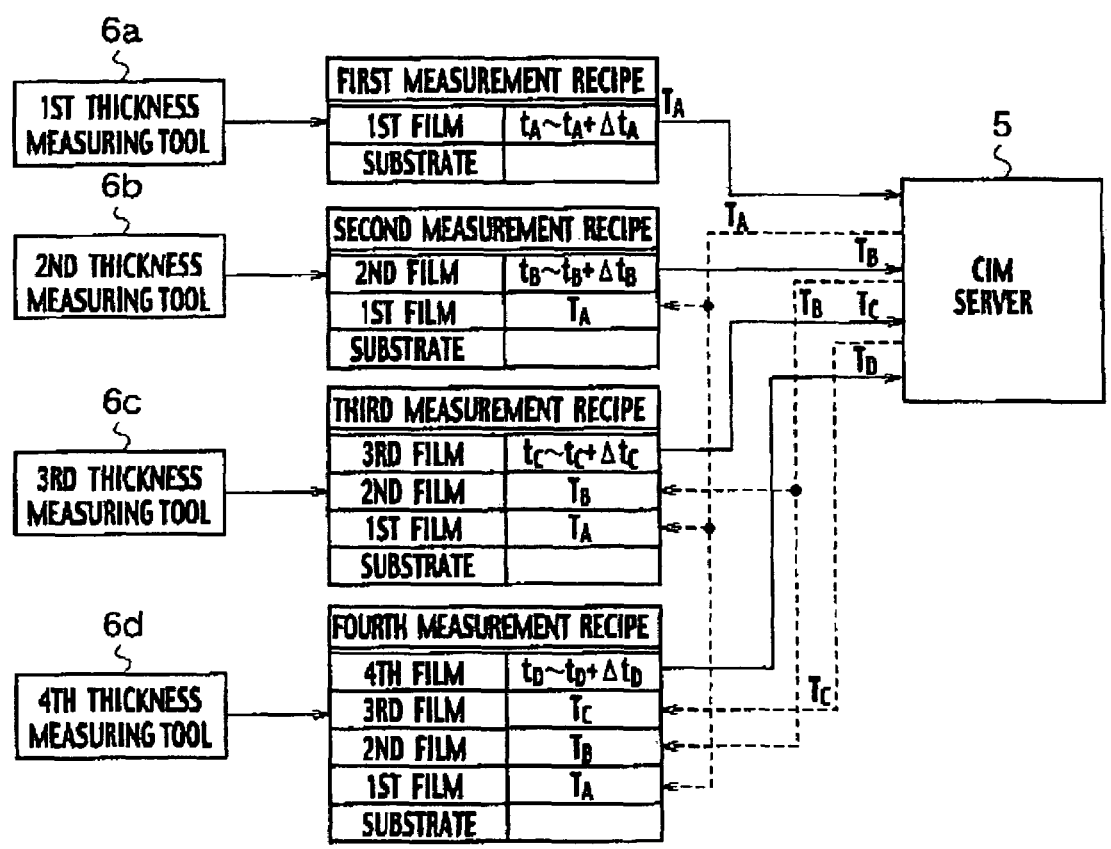
FIG. 22 is a data flow diagram showing the operation of the thickness monitoring system according to a modification of the second embodiment, which is adapted for executing in-line thickness monitoring of a four-layers structure.

FIG. 22 is a data flow diagram describing the operation of a thickness monitoring system according to the modification of the second embodiment in a case executing in-line thickness monitoring in a situation having the metallic film 2d deposited as the fourth layer on a three-layers structure. The measurement of the first film 2a, the second film 2b, and the third film 2c, is carried out in the same manner shown in the data flow diagram of FIG. 15. Here, the measurement of only the fourth film 2d will be described using the flowchart of FIG. 21, thus redundant description will be omitted. That is, the measurement of the fourth film 2d of the thickness monitoring method (in-line monitoring method) according to the modification of the second embodiment is executed in the manner put forth below:

(a) A metallic thin film is formed as the fourth film 2d on the third film 2c using a sputtering process or a vacuum evaporation deposition process. In a step S301, incident light $hv_i$ (probe light) from the probing laser 51 is irradiated upon the sample having the fourth film (metallic film) 2d formed thereon. The irradiation sites of the incident light $hv_i$ toward the substrate 1 are previously assigned on a surface of each wafer, and sorted into each lot, each wafer inside each lot, and each site inside each wafer, corresponding to irradiation sites of the first film 2a to third film 2c, so that identical sites are irradiated. The photo detector 13 is set so that the light reflected from each of the irradiation sites can be detected. The output from the photo detector 13 is fed to profile memory 24d so that data can be stored as actual measured reflection spectrums (measured waveform of optical spectrums) into the profile memory 24d.

Figure 20:
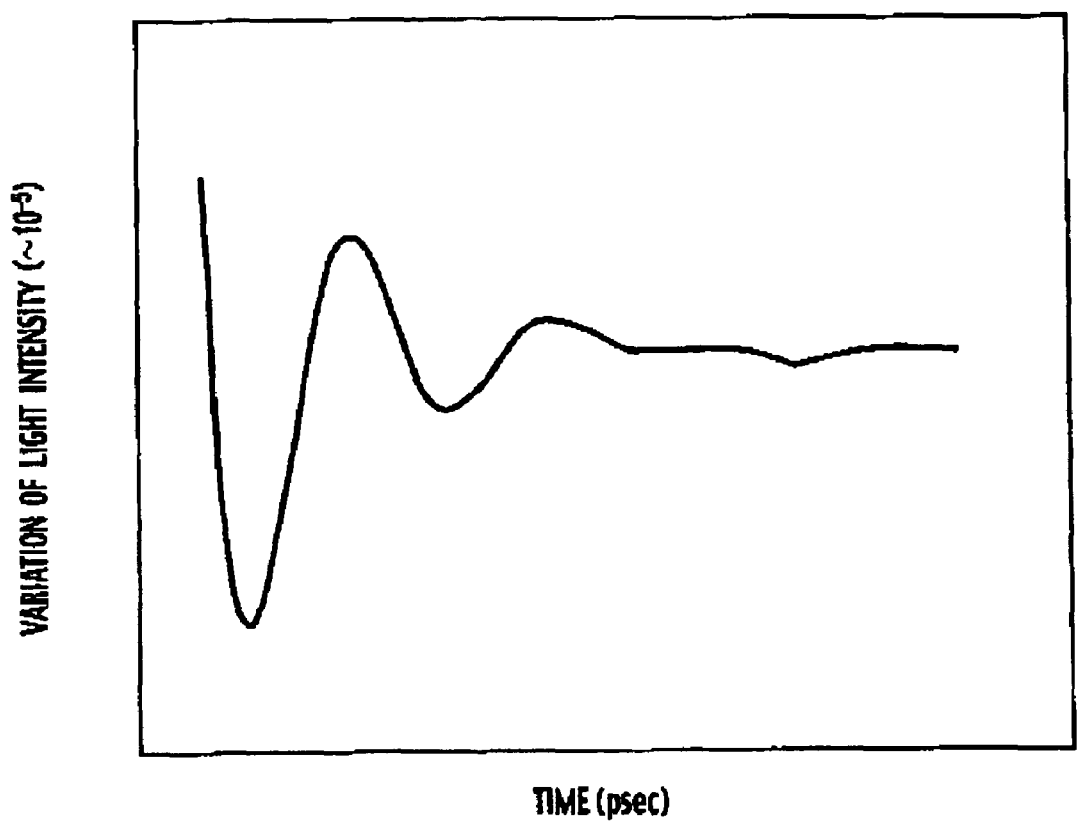
FIG. 20 is a diagram that shows the transient variation in reflected light intensity in the fourth thickness-measuring tool (opto-acoustic type thickness-measuring tool) according to the modification of the second embodiment.

(b) In this situation, in a step S302, the incident light $hv_p$ (excitation light) from the exciting laser 52 is irradiated overlapping the irradiated incident light $hv_i$ (probe light) from the probing laser 51. The pulse of the incident light $hv_p$ (excitation light) from the exciting laser 52 heats the fourth film (metallic film) 2d, generating acoustic wave. The reflected light of the probing incident light $hv_i$ (probe light) emitted from the probing laser 51, which is reflected in a period of time from the excitation time, when the pulse of the exciting incident light $hv_p$ (excitation light) emitted from the exciting laser 52 is irradiated on the fourth film 2d, manifests the attenuating profile (waveform) as shown in FIG. 20. FIG. 20 illustrates a relationship between a sequence of intensity data of reflected light originating from probe light $hv_i$ irradiated upon the surface of the fourth film 2d, and the time after irradiation of excitation light $hv_p$ on the fourth film 2d so as to generate the acoustic wave in the fourth film 2d. Therefore, the transient variation in the intensity of reflected light $hv_r$ such as that shown in FIG. 20 is stored into the profile memory 24d as a profile (waveform) of an actual measured reflection spectrum (measured waveform of optical spectrum).

(c) Next, underlying film thickness data stored into the thickness memory 26, that is, the film thickness $T_{A,LP,WQ,Sr}$ (p=1~m; q=1~n; r=1~k) of the first film 2a, the film thickness $T_{B,LP,WQ,Sr}$ (p=1~m; q=1~n; r=1~k) of the second then film 2b, and the film thickness $T_{C,LP,WQ,Sr}$ (p=1~m; q=1~n; r=1~k) of the third film 2c of each lot (p=1~m), each wafer (q=1~n), and each site (r=1~k), are read out. Then in a step S303, the calculation module 22d calculates a plurality of theoretical profiles (waveforms) of the reflection spectrums using the film thickness range (tm~tm+Δtm) of the fourth film (metallic film) 2d, which is the measurement subject and is stored into a fourth measurement recipe.

(d) In a step S304, one of profiles (waveforms) closest to the actual measured reflection spectrum of the fourth film (metallic film) 2d stored in the profile memory 24d is searched in the theoretical profiles (waveforms) of the reflection spectrums arithmetically calculated in the above mentioned step S303. Then the thickness value, upon which the closest theoretical profile (waveform) of the reflection spectrum the actual measured reflection spectrum is derived, is determined as the film thickness $T_D$ of the fourth film (metallic film) 2d for each lot (p=1~m), each wafer (q=1~n), and each site (r=1~k). Then, as shown in FIG. 22, this film thickness value is stored into the thickness memory 26 as the film thickness value $T_{D,LP,WQ,Sr}$, for each of the measured lots (p=1~m), each of the measured wafers (q=1~n), and each of the measured sites (r=1~k).

Third Embodiment

Figure 23:
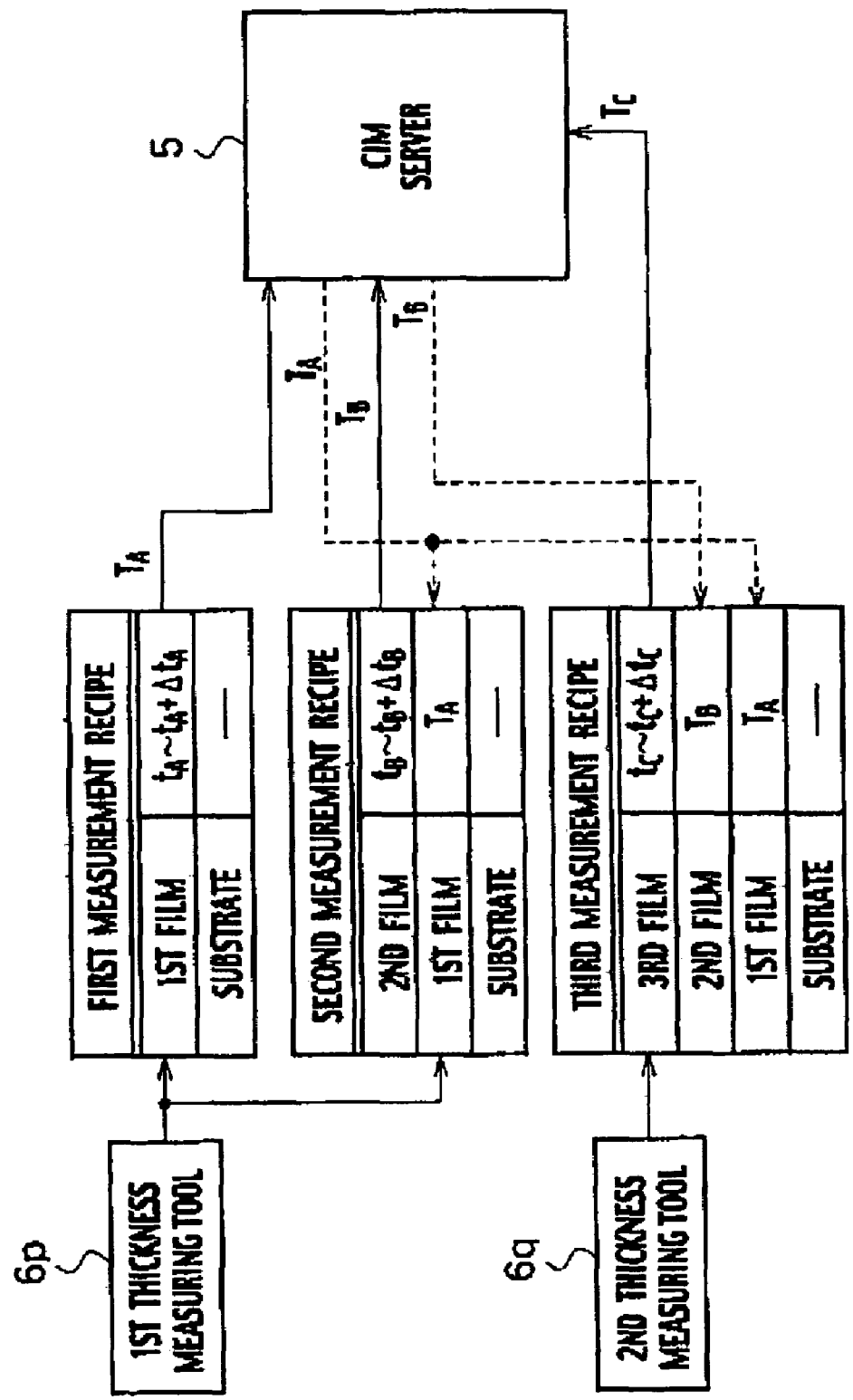
FIG. 23 is a data flow diagram showing the operation of the thickness monitoring system according to the third embodiment, which is adapted for executing in-line thickness monitoring of a three-layers structure.

FIG. 23 is a data flow diagram describing operation of a thickness monitoring system according to a third embodiment of the present invention in a case executing in-line thickness monitoring of a three-layers structure. The thickness monitoring system according to the third embodiment corresponds to a thickness monitoring system that is a combination of the first and second embodiments, as shown in FIG. 23. Namely, in a thickness monitoring method according to the third embodiment (in-line monitoring), a thickness-measuring tool 6p acquires commonly a plurality of actual measured reflection spectrums of different layers of thin films, such as the reflection spectrums of the first film 2a and the second film 2b. These actual measured reflection spectrums are commonly processed by a common measuring-tool-side computer 3 of the first thickness-measuring tool 6p, and measurement values are arithmetically calculated for both of the first film 2a and the second film 2b. On the other hand, a second thickness-measuring tool 6q acquires exclusively an actual measured reflection spectrum of a single layer of the third film 2c, and the actual measured reflection spectrum is exclusively processed by the measuring-tool-side computer 3 of the second thickness-measuring tool 2q, and a measurement value is arithmetically calculated.

(a) Namely, the first thickness-measuring tool 6p determines film thickness $T_A$ of a first thin 2a film and stores this film thickness value $T_A$ as $T_{A,LP,WQ,Sr}$, sorted into each lot (p=1~m), each wafer (q=1~n), and each site (r=1~k), into the thickness memory 26 of the CIM server (measurement control server) 5, as shown in FIG. 23.

(b) Next, after the second film 2b has been formed on the first film 2a, the first thickness-measuring tool 6p reads out the film thickness of value $T_{A,LP,WQ,Sr}$, (p=1~m; q=1~n; r=1~k) from the thickness memory 26 of the CIM server (measurement control server) 5, as shown in FIG. 23. Then, the film thickness $T_B$ of the second film 2b is determined, and is registered as $T_{B,LP,WQ,Sr}$, sorted into each lot (p=1~m), each wafer (q=1~n), and each site (r=1~k), into the thickness memory 26 of the CIM server (measurement control server) 5.

(c) Further, after the third film 2c has been formed on the second film 2b the first thickness-measuring tool 6p reads out the film thickness of value $T_{A,LP,WQ,Sr}$, (p=1~m; q=1~n; r=1~k), and $T_{B,LP,WQ,Sr}$, (p=1~m; q=1~n; r=1~k) fr thickness memory 26 of the CIM server (measurement control server) 5, as shown in FIG. 23. Then, the film thickness $T_C$ of the third film 2c is determined, and is stored as $T_{C,LP,WQ,Sr}$, sorted into each lot (p=1~m), each wafer (q=1~n), and each site (r=1~k), into the thickness memory 26 of the CIM server (measurement control server) 5.

In this manner, according to the thickness monitoring method (in-line monitoring method) according to the third embodiment, it becomes possible to measure multi-layer structure in the same amount of time it would take to measure a one-layer structure, with measurement precision equaling that of one-layer structure measurement, and lower measurement costs to around those of one-layer structure measurement. The above effectiveness is achieved by the configuration which allows the bi-directional transport of data $T_{A,LP,WQ,Sr}$, and $T_{B,LP,WQ,Sr}$, between the measuring-tool-side computer 3 of the first thickness-measuring tool 6p and the CIM server 5, and the bi-directional transport of data $T_{A,LP,WQ,Sr}$, $T_{B,LP,WQ,Sr}$, and $T_{C,LP,WQ,Sr}$ between the measuring-tool-side computer 3 of the second thickness-measuring tool 6q and the CIM server 5, as shown in FIG. 23.

(Measurement Program)

A computer implemented thickness monitoring method shown in FIGS. 10, 11, 12, 18 and 21 can be executed within the thickness monitoring systems shown in FIGS. 5, 13, 14, 16 and 19, being controlled by computer programs having algorithms identical to the flowcharts shown in FIGS. 10, 11, 12, 18 and 21. These computer programs can be stored in program memories (illustration is omitted) of the computer systems implementing the thickness monitoring systems of the first to third embodiment of the present invention.

Also, the computer program can be stored in a computer readable storage media, so as to allow the execution of a sequence of operations of the film measurement of the present invention, by reading the computer program of the film thickness monitoring from the computer readable storage media. It here, the term "computer readable storage media" mean storage devices capable of recording, such as external memory devices, semiconductor memory, magnetic disks, optical disks, magneto-optical (MO) disks, and magnetic tapes. More specifically, elements such as flexible disks, compact disk (CD)-ROM, cassette tape, and open reel tape are included in the term "computer readable storage media".

For example, the main unit of the CIM server (measurement control server) 5 can be organized so as to internally contain, or be able to be externally connected to flexible disk devices (flexible disk drives), and optical disc devices (optical disk drives). It is possible to install a computer program that is stored on this storage media into the program memory implementing the thickness monitoring system, by inserting storage media into a flexible disk drive, in a case using a flexible disk drive, or a CD-ROM, in a case using an optical disk drive, and executing desired reading operation. If it is also possible to use memory devices such as ROM, which is used in video game cartridges for example, or a cassette tape as a magnetic tape device, by connecting a desired drive device. Further, it is also possible to store the computer program into a remote program memory through communication network such as the internet.

(Semiconductor Device Manufacturing Method)

Here, a semiconductor manufacturing method according to an embodiment of the present invention will be described using a complementary metal-oxide-semiconductor (CMOS) integrated circuit as an example. Further, the semiconductor device manufacturing method and put forth herein below is only one example, and it is a matter of course that there are many other realizable manufacturing methods including this modification.

(a) First, an n-type silicon wafer of about 2~3 Ω cm with surface orientation of (100) plane is prepared as a semiconductor substrate 1. A thermal oxide film ($SiO_2$) of about 150 nm is formed on the surface of the semiconductors substrate 1. Afterward a photo resist film is coated thereupon, and using a photolithography process, this photo resist film is delineated to open a p-well formation region. Next, boron (B) ions are implanted at a dose rate of about $10^{12} \sim 10^{18}$ cm$^{-2}$ into the p-well formation region through the thermal oxide film. Next, part of the p-well formation region of the thermal oxide film is etched away. The photo resist film is removed, and after a desired cleaning process, the implanted boron is activated and thermally diffused at approximately 1200 degrees Celsius, forming a p-well.

(b) Next, the thermal oxide film formed on the main surface of the semiconductor substrate 1 is removed completely. Then another thermal oxide film ($SiO_2$) having a thickness of about 100 nm is once again formed on the main surface semiconductor substrate 1. Afterward, a silicon nitride film ($Si_3N_4$) having a thickness of about 200 nm is grown using a CVD process. A delineated photo resist pattern is formed on the silicon nitride film using a photo lithography process, and reactive ion etching (RIE) is executed using the photo resist film as a mask so as to remove selectively the silicon nitride film of an element isolation formation region. Further, part of the main surface of the semiconductor substrate 1 is etched approximately 0.3 μm~0.1 μm so as to form element isolation groove in the element isolation formation region. A plurality of active areas for arranging active elements, which are surrounded by the element isolation region, are defined by the process. At this process step, the active area is covered by the silicon nitride film. Afterward, the photo resist film used in the patterning of the silicon nitride film is removed. Impurity ions for the purpose of preventing channel inversion are implanted into the bottom of the element isolation grove by channel stop ion implantation. Further, an oxide film ($SiO_2$ film) is buried in the element isolation groove using a CVD process. Afterward, using the silicon nitride film as a stopper, the main surface of the semiconductor substrate 1 is planarized using a chemical mechanical polishing (CMP).

(c) Next, after removing the silicon nitride film, a dummy oxidation film with a thickness of about several dozen nanometers is formed in the active area. Next, a plurality of gate threshold voltage control (Vth control) ion implantations are carried out. In the Vth control ion implantations, after covering nMOS transistor formation region with a photo resist film using a photolithography process, the impurity ions for controlling pMOS gate threshold voltage are selectively implanted, and then, after covering pMOS transistor formation region with a photo resist film using a photolithography process, the impurity ions for controlling nMOS gate threshold voltage are selectively implanted. After removing the dummy oxidation film, which have been used for protecting the surface of the semiconductor substrate 1 during the Vth control ion implantation, thermal oxidation is carried out so as to form a gate oxide film. This thermal oxidation corresponds to the step S101 of FIG. 10, for example.

(d) Next in the step S102 of FIG. 10, the white incident light $hv_i$ from the light source 11 of FIG. 5 is irradiated onto the semiconductor substrate 1 having the gate oxide film as the first film 2a formed thereupon. In the step S103, light $hv_r$ reflected from the surface of the semiconductor substrate 1 is divided into component wavelengths by the spectroscope 12, and a plurality of reflection intensities are detected by the photo detector 13, sequentially in the order of resolved component wavelengths at each resolved component wavelength. Then in the step S104, a set of reflected light intensities detected by the photo detector 13 are stored into the profile memory 24 of the measuring-tool-side computer 3 so as to establish a profile of an actual measured reflection spectrum (measured profile of optical spectrum). In the step S105, a plurality of theoretical profiles of the reflection spectrums are calculated by the calculation module 22, which is installed in the measuring-tool-side computer 3. The calculations of these theoretical profiles of the reflection spectrums are executed in plural, at the film thickness range (ta~ta+Δta) of the gate oxide film (the first film) 2a that was stored in the first measurement recipe of the measurement recipe memory 25 of the measuring-tool-side computer 3. Then, one of the profiles closest to the actual measured reflection spectrum of the gate oxide film (the first film) 2a stored in the profile memory 24 is searched in the theoretical profiles of the reflection spectrums obtained in the step S105. Then, in the step S106, the variable, upon which the closest theoretical profile of the reflection spectrum to the actual measured reflection spectrum is generated, is decided as the film thickness $T_A$ of the gate oxide film (the first film) 2a. In the step S107, the film thickness value $T_A$ is stored in the thickness memory 26 to of the CIM server (measurement control server) 5.

(e) Next, in the step S111 of FIG. 11, a poly-silicon film is formed on the gate oxide film (the first film) 2a as a second film 2b using a CVD furnace. Afterward in the step S112, the white incident light $hv_i$ is irradiated onto the semiconductor substrate 1 having the poly-silicon film (second film) 2b formed thereupon. In the step S113, the light $hv_r$ reflected from the semiconductor substrate 1 is divided into component wavelengths by the spectroscope 12 and a plurality of reflection intensities are detected by the photo detector 13, sequentially in the order of resolved component wavelengths at each resolved component wavelength. Afterward, in the step S114, a set of reflected light intensities detected by the photo detector 13 are stored into the profile memory 24 so as to establish a profile of an actual measured reflection spectrum (measured profile of optical spectrum). In the step S115, the underlying film thickness $T_{A,LP,WQ,Sr}$, (p=1~m; q=1~n; r=1~k) stored in the thickness memory 26 of the CIM server 5 is read out. In the step S116, the calculation module 22 calculates a plurality of theoretical profiles of the reflection spectrums using the film thickness range (tb~tb+Δtb) of the poly-silicon film (second film) 2b that has been stored in the second measurement recipe of the measurement recipe memory 25. Then, one of the profiles closest to the actual measured reflection spectrum of the poly-silicon film (second film) 2b stored in the profile memory 24 is searched in the theoretical profiles of the reflection spectrums obtained in the step S116. Then, in the step S117, the variable, upon which the closest theoretical profile of the reflection spectrum to the actual measured reflection spectrum is generated, is decided as the film thickness $T_B$ of the poly-silicon film (second film) 2b. The film thickness $T_B$ is stored as the film thickness value $T_{B,LP,WQ,Sr}$, for each lot (p=1~m), each wafer (q=1~n) and each site (r=1~k) in the thickness memory 26 of the CIM server (measurement control server) 5 in the step S118. Namely, film thickness values $T_{B,LP,WQ,Sr}$, of the poly-silicon film (second film) 2b are sorted into each lot (p=1~m), each wafer (q=1~n) and each site (r=1~k), and are stored into the thickness memory 26 in the data structure shown in FIG. 7B.

(f) A delineated photo resist pattern is formed on the poly-silicon film (second film) 2b by a photolithography process. Then, using the delineated photo resist film as a mask, the poly-silicon film (second film) 2b is selectively etched by dry etching processes such as RIE so as to form gate electrodes and poly-silicon wiring. Afterward the photo resist film is removed. Next, source and drain regions are selectively formed on the semiconductor substrate 1. First of all, the p-well, and the top of the gate electrodes lying above the p-well are covered by a new photo resist film, using a photolithography process. Then using the poly-silicon gate electrode as an implant stop, $10^{15}$ cm$^{-2}$ order p-type impurity ions such as boron ($^{11}$B$^+$) ions are implanted into n-type regions exposed at surfaces of active areas with self-aligned ion implantation. In the p-type self-aligned ion implantation, p-type impurity ions are also implanted into the poly-silicon gate electrodes. Afterward, after removing the photo resist film, the tops of n-type regions are covered with another photo resist film using a photolithography process. Then using the poly-silicon gate electrode as a mask, $10^{15}$ cm$^{-2}$ order n-type impurity ions such as arsenic ($^{75}$As$^+$) ions are implanted into p-wells exposed at surfaces of active areas with self-aligned ion implantation. In the n-type self-aligned ion implantation, n-type impurity ions are also implanted into the poly-silicon gate electrodes. Afterward, the photo resist film is removed. Next, the semiconductor substrate 1 is annealed so as to activate the implanted ions, impurities are thermally diffused into semiconductor substrate 1, and n type source and drain regions are formed in and at the surface of the p-wells, p-type source and drain regions in and at the surface of the n-type regions defined in the active areas. Simultaneously, the p-type impurity ions and n-type impurity ions that have been implanted into the poly-silicon gates electrodes are activated so that both poly-silicon gate electrodes on the pMOS transistor side and the nMOS transistor side can manifest low in resistance.

(g) Next, a first interlayer insulation film is deposited on the poly-silicon gates electrodes (second film) 2b as the third film 2c by CVD process for the purpose of insulation between first level metallic interconnections and the poly-silicon gates electrodes. The deposition of the first interlayer insulation film (the third film) 2c corresponds to a step S121 in the flowchart of FIG. 12. Afterward, in a step S122, the white incident light hv$_i$ is irradiated onto the semiconductor substrate 1 having the first interlayer insulation film (the third film) 2c formed thereupon. In a step S123, the light hv$_r$ reflected from the semiconductor substrate 1 is divided into component wavelengths by the spectroscope 12 and a plurality of reflection intensities are detected by the photo detector 13, sequentially in the order of resolved component wavelengths at each resolved component wavelength. Afterward, in a step S124, a set of reflected light intensities detected by the photo detector 13 are stored into the profile memory 24 so as to establish a profile of an actual measured reflection spectrum (measured profile of optical spectrum).

(h) In a step S125, the underlying film thickness $T_{A,LP,WQ,Sr}$, (p=1~m; q=1~n; r=1~k) of the first film (gate electrode) 2a, and $T_{B,LP,WQ,Sr}$, (p=1~m; q=1~n; r=1~k) of the second film (poly-silicon film) 2b that has been stored into the thickness memory 26 is read out. In a step S126, the calculation module 22 calculates a plurality of theoretical profiles of the reflection spectrums using the film thickness range (tc~tc+Δtc) of the third film (first interlayer insulation film) 2c that has been stored in the third measurement recipe. Then, one of the profiles closest to the actual measured reflection spectrum of the third film (first interlayer insulation film) 2c stored in the profile memory 24 is searched in the theoretical profiles of the reflection spectrums obtained in the step S126. Then, in a step S127, the variable, upon which the closest theoretical profile of the reflection spectrum to the actual measured reflection spectrum is generated, is decided as the film thickness T$_C$ of the third film (first interlayer insulation film) 2c. In a step S128, the film thickness T$_C$ is stored in the thickness memory 26 as as the film thickness value $T_{C,LP,WQ,Sr}$, for each lot (p=1~m), each wafer (q=1~n) and each site (r=1~k) in the thickness memory 26 of the CIM server (measurement control server) 5. Namely, film thickness value $T_{C,LP,WQ,Sr}$, of the third film (first interlayer insulation film) 2c are sorted into each lot (p=1~m), each wafer (q=1~n) and each site (r=1~k), and are stored into the thickness memory 26 in the data structure shown in FIG. 7C.

(i) Next, a delineated photo resist pattern is formed on the third film (first interlayer insulation film) 2c using a photolithography process. RIE is then executed using the photo resist film as a mask, so as to open contact holes within the third film (first interlayer insulation film) 2c, thereby selectively exposing a part of the p-type source and drain regions and the n-type source and drain regions at bottoms of the contact holes. Further, a new delineated photo resist pattern is formed using a photolithography process. RIE is then executed using the photo resist film as a mask, forming grooves (damascene grooves) used for the first level metallic interconnection. The interior of the contact holes, and the interior of the grooves (damascene grooves) are filled with a copper (Cu) film by plating. The surface of the third film (first interlayer insulation film) 2c is then planarized using CMP planarization, burying copper in interior of the contact holes, and the interior of the grooves (damascene grooves) so as to form the first level metallic interconnection.

(j) Next, a second interlayer insulation film 2d is deposited on the first level metallic interconnection as the fourth film by a CVD process for the purpose of insulation in between a second level metallic interconnection and the first level metallic interconnection. Afterward, the white incident light hv$_i$ is is irradiated onto the semiconductor substrate 1 having the second interlayer insulation film (the fourth film) 2d formed thereupon. The light hv$_r$ reflected from the semiconductor substrate 1 is divided into component wavelengths by the spectroscope 12 and a plurality of reflection intensities are detected by the photo detector 13, sequentially in the order of resolved component wavelengths at each resolved component wavelength. Afterward, a set of reflected light intensities detected by the photo detector 13 are stored into the profile memory 24 as a profile of an actual measured reflection spectrum (measured profile of optical spectrum). The film thickness $T_{A,LP,WQSr}$, (p=1~m; q=1~n; r=1~k) of the first film (gate electrode) 2a, $T_{B,LP,WQ,Sr}$, (p=1~m; q=1~n; r=1~k) of the second film (poly-silicon film) 2b, and $T_{C,LP,WQ,Sr, (p=}$1~m; q=1~n; r=1~k) of the third film (first interlayer insulation film) 2c that has been stored into the thickness memory 26 are read out. The calculation module 22 calculates a plurality of theoretical profiles of the reflection spectrums using the film thickness range (td~td+Δtd) of the fourth film (second interlayer insulation film) 2d that has been stored in the fourth measurement recipe. Then, one of the profiles closest to the actual measured reflection spectrum of the fourth film (second interlayer insulation film) 2d stored in the profile memory 24 is searched in the theoretical profiles of the reflection spectrums. Then, the variable, upon which the closest theoretical profile of the reflection spectrum to the actual measured reflection is generated, is decided as the film thickness T$_D$ of the fourth film (second interlayer insulation film) 2d. The film thickness T$_D$ is stored in the thickness memory 26 as the film thickness value $T_{D,LP,WQ,Sr}$, for each lot (p=1~m), each wafer (q=1~n) and each site (r=1~k) in the thickness memory 26 of the CIM server (measurement control server) 5.

(k) Next, a delineated photo resist pattern is formed on the second interlayer insulation film (the fourth film) 2d using a photolithography process. RIE is then executed using the photo resist film as a mask, opening via holes within the second interlayer insulation film (the fourth film) 2d reaching to the first level metallic interconnection. Further, a new delineated photo resist pattern is formed using a photolithography process. RIE is then executed using the photo resist film as a mask, forming grooves (second level damascene grooves) used for the second level metallic interconnections. The interior of the via holes, and the interior of the second level damascene grooves are filled with a copper (Cu) film by plating. The surface of the second interlayer insulation film (the fourth film) $2d$ is then planarized using CMP planarization, burying copper in interior of the via holes, and the interior of the grooves (damascene grooves) so as to provide second level metallic interconnections.

(l) Next a fifth film (a third interlayer insulation film) is deposited on the second level metallic interconnections by a CVD process for the purpose of insulation in between third and second level metallic interconnection. Next the film thickness values of the first through fourth films are read out from the thickness memory 26 in the same manner as in the determination of the first to fourth films. A plurality of theoretical profiles of the reflection spectrums are calculated using the film thickness range of the fifth film (the third interlayer insulation film) that was stored in a fifth measurement recipe. Then, one of the profiles closest to the actual measured reflection spectrum of the fifth film (the third interlayer insulation film) stored in the profile memory 24 is searched in the theoretical profiles of the reflection spectrums. Then, the variable, upon which the closest theoretical profile of the reflection spectrum to the actual measured reflection spectrum is generated, is decided as the film thickness of the fifth film (the third interlayer insulation film). Then the film thickness value is stored in the thickness memory 26.

From here on, while performing the similar in-line monitoring, a semiconductor device according to an embodiment of the present invention is completed by necessary multilevel metallization process. For example, in the same manner as to first to fifth films, from the sixth film (fourth interlayer insulation film) to the ninth film (eighth interlayer insulation film) can be stacked with repeating similar in-line monitoring methods. Using a CVD process, a passivation film having a thickness of about 1 µm is deposited on the uppermost metallic wiring layer to prevent mechanical damage, and penetration of moisture and impurities. Films such as PSG film and silicon nitride film are used as the passivation film.

According to a thickness monitoring method associated with embodiments, for measuring thickness of the top layer of a multi-layer structure, it is not necessary to measure the film thicknesses of underlying layers at the same time as in earlier technology. Namely, for measuring the film thickness of a j-layers structure implemented by a j-th film, a (j−1)th film, a (j−2)th film/ . . . /a second film/ a first film and the substrate 1, in the case that the only subject layer that needs to be measured is the uppermost layer, it is not necessary to measure the (j−1)th film, the (j−2)th film/ . . . /the second film/the first film. This is accomplished by data bi-directional transportation between the thickness memory and the calculation module, and thicknesses data for underlying layers can be provided from the thickness memory, which store the thicknesses data for underlying layers after executing each of the in-line monitoring of the (j−1)th film, the (j−2)th film/ . . . /the second film, the first film, at respective process steps.

Therefore, the theoretical profile of the reflection spectrum of upper layer can be calculated as if thickness of a one-layer structure, such that a first film is deposited on the substrate, is calculated and the measurement time period, and measurement precision becomes equivalent to that in a case measuring the film thickness of a single layer.

In recent LSI, multi-layer structure of above ten to thirteen layers have become commonplace, and according to the thickness monitoring method associated with the embodiment of the present invention, a significant reduction in measurement time of the multi-layer structure having particularly numerous layers is achieved. Also, according to a thickness monitoring method of the embodiments, it is possible to suppress increases in manufacturing costs because it becomes unnecessary to insert extra semiconductor wafers for the dedicated purpose of in-line monitoring, in each of the process steps where each of thin films is formed. And, according to a thickness monitoring method of the embodiments, significant effectiveness of suppression of increases in manufacturing costs can be achieved for a multi-layer structure having particularly numerous layers.

Other Embodiments

Various modifications will become possible for those skilled in the art after receiving the teaching of the present disclosure without departing from the scope thereof. Thus, the present invention of course includes various embodiments and modifications and the like which are not detailed above. Therefore, the scope of the present invention will be defined in the following claims.

What is claimed is:

1. A method for monitoring a thickness of an uppermost film deposited on an underlying multi-layer structure, the underlying multi-layer structure comprising a plurality of thin films formed on a substrate, the method comprising:

determining thickness data of each of the thin films of the underlying multi-layer structure before the uppermost film is formed on the underlying multi-layer structure, and storing the thickness data of the thin films of the underlying multi-layer structure in a thickness memory;

measuring an optical spectrum profile of the uppermost film after the uppermost film is formed on the underlying multi-layer structure;

reading the thickness data of each of the thin films of the underlying multi-layer structure from the thickness memory;

calculating a plurality of theoretical optical spectrum profiles of the uppermost film based upon corresponding candidate film thicknesses of the uppermost film, using a measurement recipe for the uppermost film and the thickness data of each of the thin films of the underlying multi-layer structure; and searching one of the theoretical profiles of the optical spectrum of the uppermost film, which is closest to the measured optical spectrum profile of the uppermost film so as to determine a thickness of the uppermost film by the closest theoretical profile.

2. The method of claim 1, wherein the underlying multi-layer structure comprises a first film formed on the substrate and a second film formed on the first film, wherein determining the thickness data of the second film comprises:

determining thickness data of the first film before the second film is formed on the first film, and storing the thickness data of the first film in the thickness memory;

measuring an optical spectrum profile of the second film after the second film is formed on the first film;

reading the thickness data of the first film from the thickness memory;

calculating a plurality of theoretical optical spectrum profiles of the second film based upon corresponding candidate film thicknesses of the second film, using a measurement recipe for the second film and the thickness data of the first film; and searching one of the theoretical optical spectrum profiles of the second film, which is closest to the measured optical spectrum profile of the second film so as to determine a thickness of the second film by a closest theoretical profile of the second film.

3. The method of claim 2, wherein determining the thickness data of the first film comprises:

measuring an optical spectrum profile of the first film;

calculating a plurality of theoretical optical spectrum profiles of the first film based upon corresponding candidate film thicknesses of the first film, using a measurement recipe for the first film; and searching one of the theoretical optical spectrum profiles of the first film, which is closest to the measured optical spectrum profile of the first film, so as to determine a thickness of the first film by a closest theoretical profile of the first film.

4. The method of claim 1, wherein the measured optical spectrum profile is established by a relationship between a sequence of intensity data of reflected light originating from white light irradiated upon a surface of the uppermost film, and component wavelengths of the reflected light.

5. The method of claim 1, wherein the measured optical spectrum profile is established by a relationship between a sequence of ellipso-parameter data of reflected light originating from polarized white light irradiated upon a surface of the uppermost film, and the component wavelengths of the reflected light, the ellipso-parameter data changes in light polarization induced by reflection of the light.

6. The method of claim 1, wherein the measured optical spectrum profile is established by a relationship between a sequence of intensity data of reflected light originating from probe light irradiated upon a surface of the uppermost film, and an attenuation of an acoustic wave generated in the uppermost film by an irradiation of exciting light on the uppermost film.

* * * * *